(12) United States Patent
Goren et al.

(10) Patent No.: US 7,308,276 B2
(45) Date of Patent: Dec. 11, 2007

(54) METHOD FOR LOCATING MOBILE UNITS BASED ON RECEIVED SIGNAL STRENGTH RATIO

(75) Inventors: David P. Goren, Smithtown, NY (US); Hoai Xuan Vu, Westminster, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1100 days.

(21) Appl. No.: 10/454,147

(22) Filed: Jun. 4, 2003

(65) Prior Publication Data

US 2004/0022214 A1 Feb. 5, 2004

Related U.S. Application Data

(60) Provisional application No. 60/385,547, filed on Jun. 4, 2002.

(51) Int. Cl.
*H04Q 7/20* (2006.01)
*G01S 3/02* (2006.01)

(52) U.S. Cl. .................. 455/456.5; 342/451; 342/458; 342/464; 342/357.03

(58) Field of Classification Search ............. 455/456.1; 370/332, 328; 342/126, 450–451, 458, 357.01, 342/357.02, 357.03, 463–465

See application file for complete search history.

(56) References Cited

U.S. PATENT DOCUMENTS

| 6,304,218 B1 * | 10/2001 | Sugiura et al. ............. 342/464 |
| 6,889,053 B1 * | 5/2005 | Chang et al. ............ 455/456.3 |
| 2002/0122003 A1 * | 9/2002 | Patwari et al. .............. 342/450 |

OTHER PUBLICATIONS

"Enhancements to the RADAR User Location and Tracking System" by Bahl et al.; *Microsoft Research* and *University of California at San Diego*; pp. 1-13.
"User Location and Tracking in an In-Building Radio Network" by Paramvir Bahl; *Microsoft Research, Technical Report*, Feb. 1999, pp. 1-12.

* cited by examiner

*Primary Examiner*—Rafael Perez-Gutierrez
*Assistant Examiner*—Nimesh Patel
(74) *Attorney, Agent, or Firm*—Fay Kaplun & Marcin, LLP

(57) ABSTRACT

Location of mobile units in a wireless local area network is based on use of signal strength ratios and other criteria. In one embodiment absolute value of signal strength is used to derive a second value of location. The second value may be used as the location if the system is not calibrated and may also be used to calibrate the system. Alternatively time difference of arrival may be used in combination with signal strength ratio.

5 Claims, 8 Drawing Sheets

METHOD FOR LOCATING MOBILE UNITS BASED ON RECEIVED SIGNAL STRENGTH RATIO

REFERENCE TO RELATED APPLICATION

This Application claims the benefit of Provisional Application Ser. No. 60/385,547, filed Jun. 4, 2002.

BACKGROUND OF THE INVENTION

This invention relates to object location systems, and particularly to systems having a plurality of access points wherein mobile units communicate with the access points using a wireless data communications protocol, such as IEEE Standard 802.11. The invention particularly relates to systems wherein location of a mobile unit is determined by measuring the signal strength of mobile unit transmissions which are received by access points to estimate the range of a mobile unit from the access point. As used in this application the term "access point" is intended to apply to access points as contemplated by Standard 802.11, or other standards, that interface a computer or a wired network to the wireless medium, and also RF Ports and cell controllers connected thereto, as described in co-pending application Ser. No. 09/528,697, filed Mar. 17, 2000, the specification of which is incorporated herein by reference.

A major variable in determination of range of a mobile unit from an access point is the signal strength of the mobile unit. There can be significant variation in transmitted signal strength of transmitter cards (NIC cards) from different manufacturers and even in cards from the same manufacturer from different production runs. Further the transmitter signal strength may vary over the life of a mobile unit and the life of its rechargeable battery.

Differences in transmitter power for mobile units in a system can be calibrated out by doing a measurement of signal strength as received from a known distance and providing a correction factor that is identified with that particular mobile unit. Such calibration requires special calibration procedures for each mobile unit as it is put into service, and, unless units are recalibrated, cannot account for changes in transmitter power as the mobile unit or its battery ages.

It is therefore an object of the present invention to provide new and improved methods of determining the location of a mobile unit.

SUMMARY OF THE INVENTION

In accordance with the invention there is provided a method for locating mobile units arranged for radio communication with fixed devices. Received signal strength is detected for transmissions from one of the mobile units to a selected plurality of fixed devices having known locations. A first location of the mobile unit is determined based on ratios of the detected signal strength for pairs of the fixed devices. A second location of the mobile unit is determined based on absolute value of the detected signal strengths for each of the fixed devices, corrected by a calibration value for the mobile unit. A difference between the first location and the second location is calculated. The first location for the mobile unit is selected if the difference exceeds a predetermined value, and the second location for the mobile unit is selected if the difference does not exceed a predetermined value.

In a preferred method the correction value for the mobile unit is updated if the difference exceeds the predetermined value.

In accordance with the invention there is provided a method for locating mobile units arranged for radio communication with fixed device within an area. Received signal strength is detected for transmissions from one of the mobile units to a selected plurality of fixed devices having known locations. A first location of the mobile unit is determined based on ratios of the detected signal strength for pairs of the fixed devices. A second location of the mobile unit is determined based on absolute value of the detected signal strengths for each of the fixed devices, corrected by a calibration value for the mobile unit. The first location for the mobile unit is selected if one of the first and second locations is within a selected portion of the area. The second location for the mobile unit is selected if the one of the first and second locations is not within the selected portion of the area.

In accordance with the invention there is provided a method for calibrating mobile units arranged for radio communication with fixed devices. Received signal strength is detected for transmissions from one of the mobile units to a selected plurality of fixed devices having known locations. A first location of the mobile unit is determined based on ratios of the detected signal strength for pairs of the fixed devices. A second location of the mobile unit is determined based on absolute value of the detected signal strengths for each of the fixed devices, corrected by a calibration value for the mobile unit. A difference between the first location and the second location is calculated. The calibration value for the mobile unit is updated if the difference exceeds a predetermined value.

In a preferred arrangement the updating is performed only if a selected one of the first and second locations is within a selected portion of the area.

In accordance with the invention there is provided a method for locating mobile units arranged for radio communication with fixed devices. Received signal strength is detected for transmissions from one of the mobile units to a first selected plurality of fixed devices having known locations. Time of arrival for the transmissions is detected at a second selected plurality of the fixed devices. Ratio of the received signal strength is computed for at least one pair of the fixed devices in the first plurality. Time difference of arrival is computed for at least one pair of the fixed devices in the second plurality. The maximum likelihood location for the mobile unit is computed using the computed ratio and the time difference of arrival.

In one arrangement the first plurality and the second plurality include at least three fixed devices. The first plurality may be the same as the second plurality and includes at least three fixed devices.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
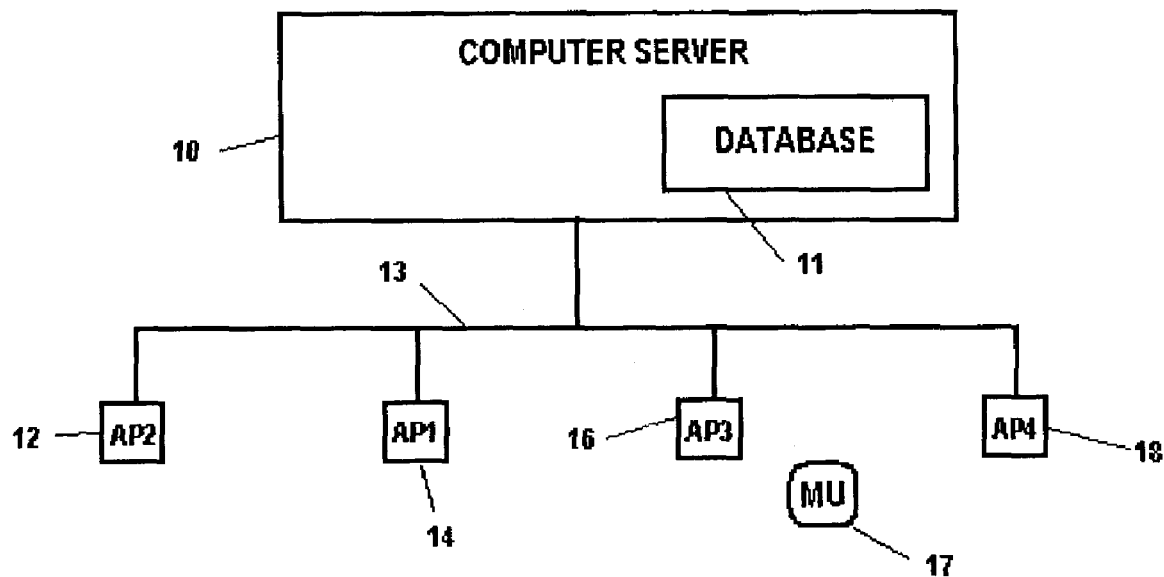
FIG. 1 is a block diagram showing a system in which the methods of the invention may be practiced.

Referring to FIG. 1 there is shown a representative wireless local area network, operating, for example, using the protocol of IEEE Standard 802.11 to provide wireless data communication functions between computer server 10 and mobile units 17. It is known to use such networks to provide location functions for locating mobile units, such as mobile unit 17 within the area serviced by the wireless local area network.

Location determination may be based on the signal strength of signals transmitted by mobile unit 17 and received by a plurality of fixed location access points 12, 14, 16 and 18. Signal strength is measured at the access points using the RSSI function of Standard 802.11, and data corresponding to the received signal strength is sent to computer server 10 over local area network (LAN) 13 for comparison to database 11, maintained therein, which correlates signal strength to location within the area. It is likewise known to use ratio of signal strength as received by the various access points to compare to a database 11 to determine location. Alternately location may be determined by computer 10 based only on ratios of signal strength without using a database.

Figure 2:
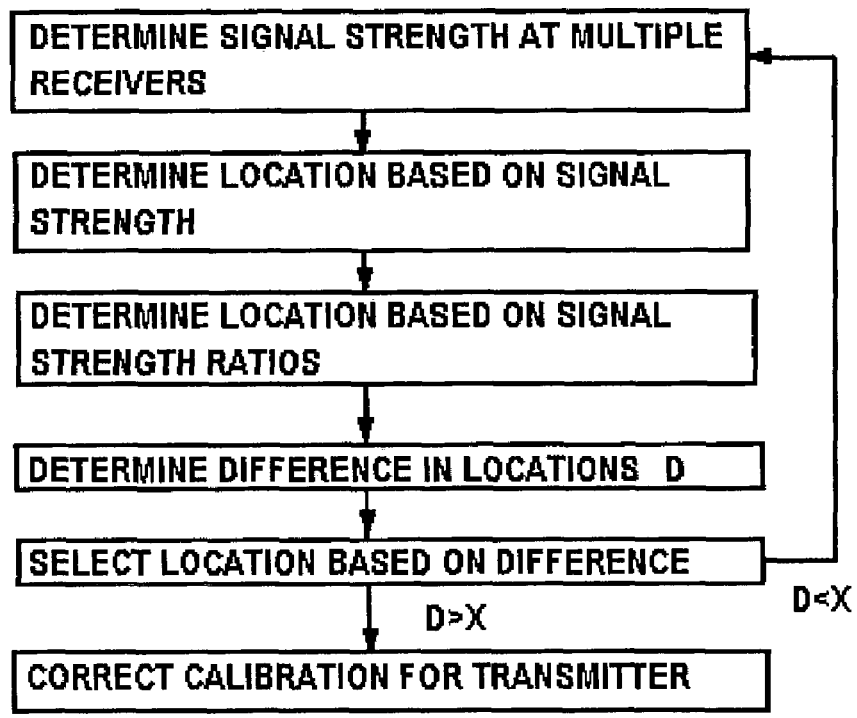
FIG. 2 is a flow diagram showing a first embodiment of a method in accordance with the present invention.

FIG. 2 is a flow diagram for a first embodiment of the method of the present invention. In accordance with the first embodiment the signal strength of signals sent from the mobile unit 17 to a plurality, for example three or four access points 12, 14, 16, 18 are provided to computer 10 over local area network 13. Computer 10 computes location for mobile unit 17 using the absolute value of the signal strength data. Computer 10 also computes the location of mobile unit 17 using ratios of signal strength for pairs of the access points.

Figure 4:
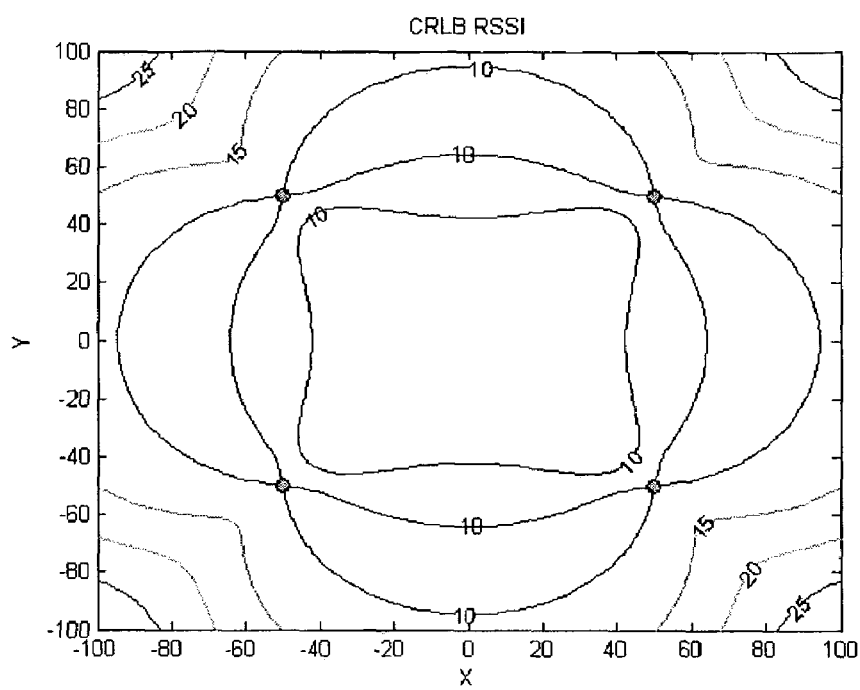
FIG. 4 is a diagram showing theoretical location accuracy for a location system using calibrated signal strength.
Figure 5:
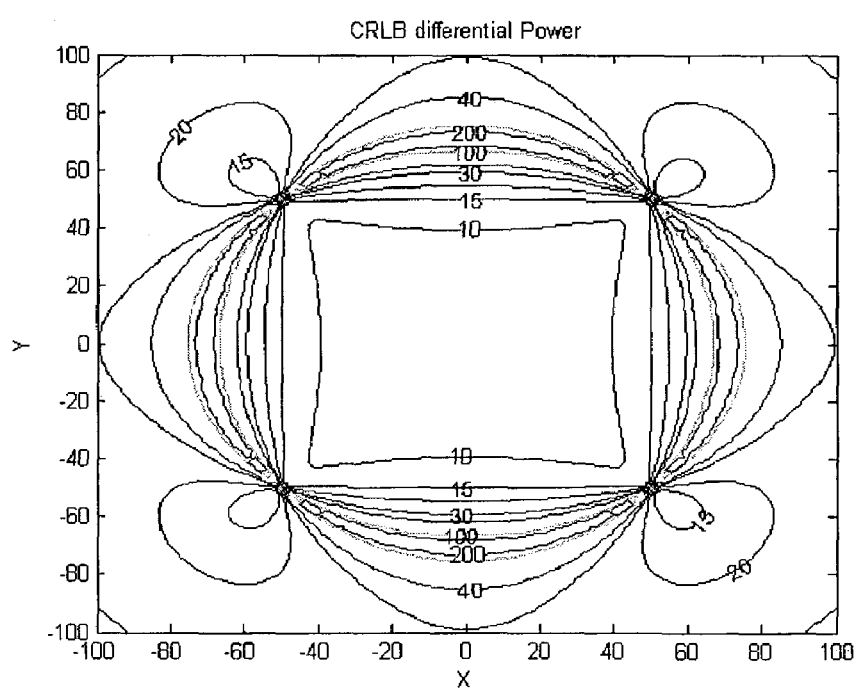
FIG. 5 is a diagram showing theoretical location accuracy for a location system using differential signal strength.

Referring to FIGS. 4 and 5 there are shown theoretical contours of accuracy in feet for determination of location from signal strength data for a system having four access points arranged in a square pattern. FIG. 4 shows the contours for location using signal strength absolute value, provided the system is calibrated to the actual transmitter power of the mobile unit. Computer 10 maintains correction values for each mobile unit which are used to correct the signal strength data for the actual power of the mobile unit transmitter. FIG. 5 shows contours of accuracy for determination of location using ratio of received signal strength, where calibration of transmitter power is not required. Comparison of the contours in FIGS. 4 and 5 indicates that both methods of location determination have comparable accuracy within the area bounded by the access points.

Using the information from FIGS. 4 and 5 it can be seen that use of absolute signal strength is appropriate for greater accuracy (1) if the system is callibrated for transmitter power of the mobile units and/or (2) the mobile unit is located outside the area bounded by the access points. In the embodiment of the invention depicted in FIG. 2, the location of the mobile unit 17 is determined using both actual values of signal strength and ratios of signal strength at pairs of access points. If the difference D between the determined values exceeds a selected value X, it is assumed the the system is not calibrated for transmitter power of the mobile unit 17. In this case, the location of the mobile unit 17 is selected to be the location determined by ratio of received signal power. As an additional feature, the correction value for the mobile unit 17 can be updated based on the observed difference in location computed by the two methods, preferrably in a manner that causes the correction value to converge on the correct value after a sequence of updates. This may be achieved using an adjustment to the correction value that is, for example, one-half of the difference in actual signal level observed.

In a variation of the method depicted in FIG. 2, location is initially determined based on one or a combination of the two location determinations, preferably the ratio determination. If the mobile unit is intially determined to be in a portion of the area bounded by the access points, where ratio calculation is most accurate, the ratio calculation of location is selected for the mobile unit location. If the mobile unit is initially determined to be outside the portion of the area bounded by the access points, the location calculated using absolute signal strength values is selected for the mobile unit location.

Figure 3:
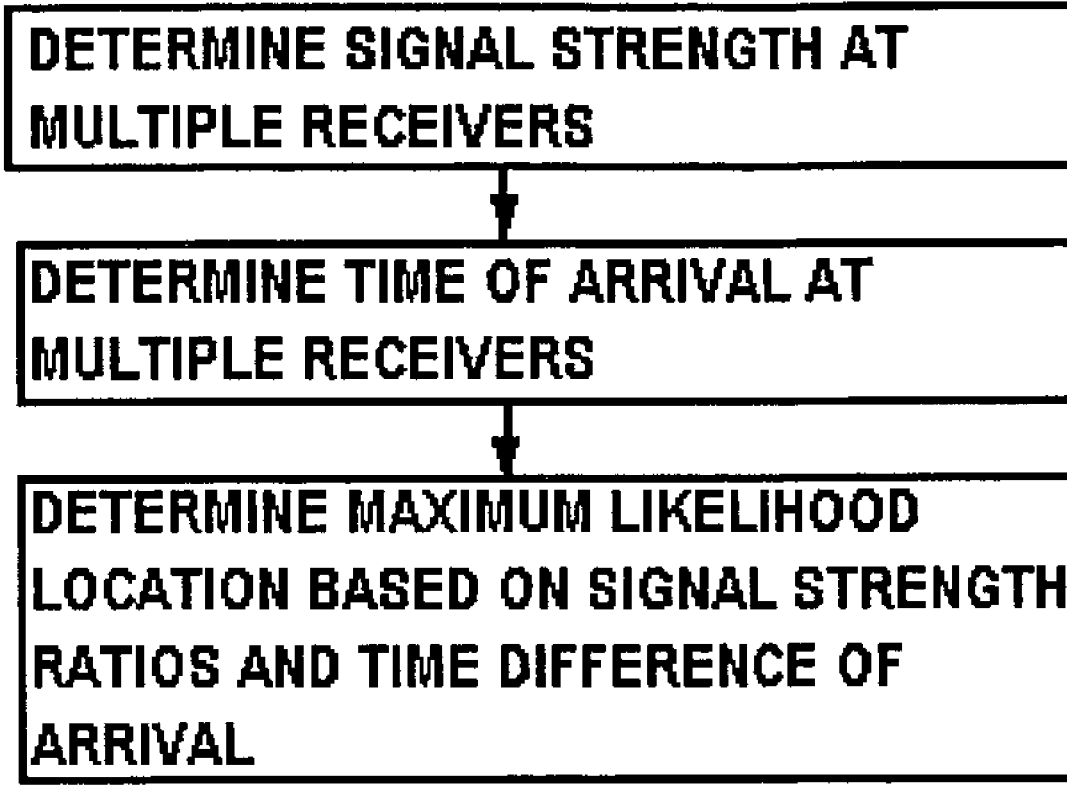
FIG. 3 is a flow diagram showing a second embodiment of a method in accordance with the present invention.

Referring to FIG. 3 there is shown an alternate embodiment of the method of the present invention wherein the access points 12, 14, 16, 18, measure time of arrival for signals sent from the mobile unit 17 in addition to measurement of received signal strength. In accordance with the embodiment of FIG. 3, the location of the mobile unit is determined using a maximum likelihood calculation based on a combination of the received signal strength values and time of arrival measurement. An exemplary maximum likelihood calculation is described below.

Modem commercial indoor localization systems typically operate on the premise of either Time-Difference-of-Arrival (TDoA) or Signal Strength (SS) measurements at a number of fixed receivers. An example of TDoA implementation is the WhereNet system which operates in the unlicensed 2.4 GHz ISM band. This particular system combats performance degradation due to multipath fading by utilizing larger bandwidth than 802.11b systems, a manifestation of higher chip rate. This would cause a problem if one wishes to utilize an existing 802.11b infrastructure for localization purposes. Examples of SS implementation also operate in the unlicensed 2.4 GHz ISM band. These SS systems share the same drawbacks: a fairly elaborate site-survey to develop a radio signal characteristic database 11, and susceptibility to variations in transmitters' radiated power.

It is desireable that an indoor localization method employs existing 802.11 infrastructures. For the TDoA approach, good accuracy must be provided in the face of a low chip rate. This can only be achieved with a very sophisticated mathematical method capable of resolving the line-of-sight component from multipath-corrupted TDoA measurements. For the SS approach, it appears that the elaborate site-survey to develop a database is an inescapable eventuality due to lack of accurate indoor RF propagation models, but the susceptibility to variations in transmitters' radiated power may be resolved.

Figure 6:
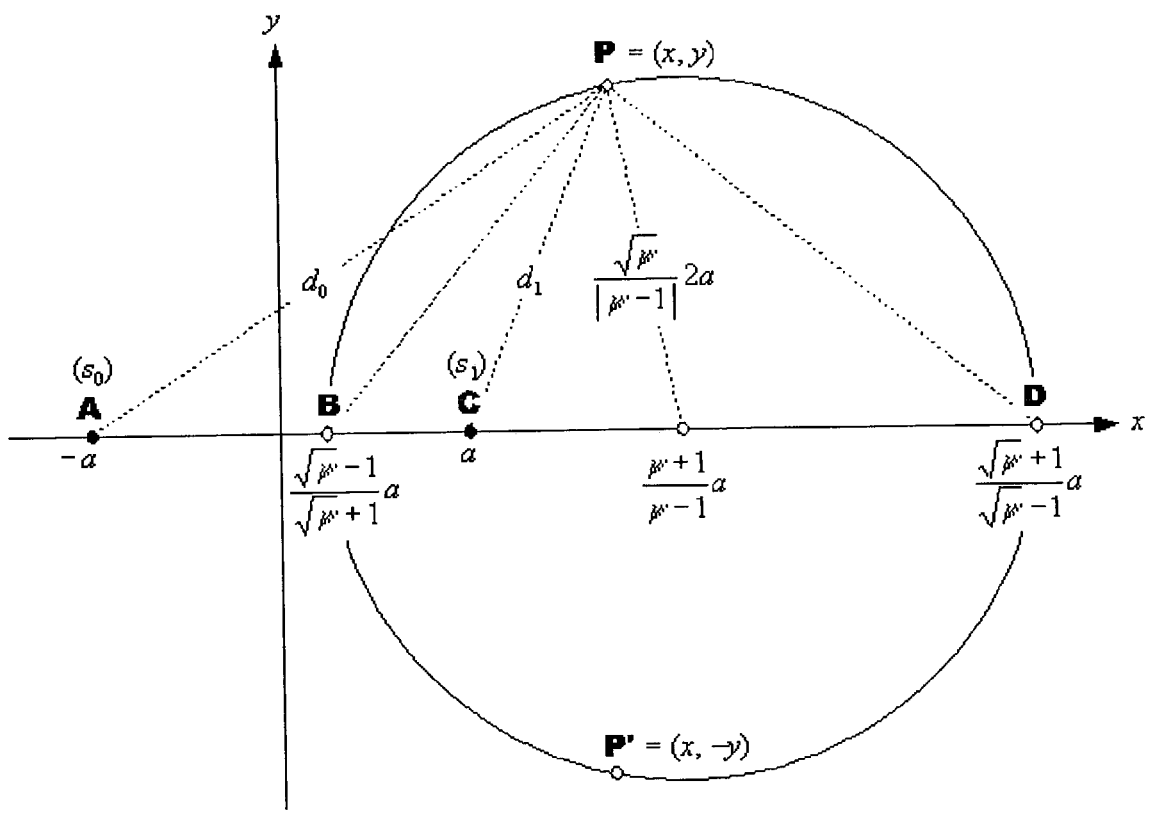
FIG. 6 is a diagram illustrating location using signal strength ratio for two fixed devices.

The geometry for location by signal strength using two access points is shown in FIG. 6 where P is a transmitter at (x,y), A and C are two receivers at (−a, 0) and (a, 0) which receive transmission from P with signal power measurements $s_0$ and $s_1$, respectively. Let $\psi = s_1/s_0 \geq 0$. Then:

$$d_0^2 = \overline{PA}^2 = (x+a)^2 + y^2 \text{ and } d_1^2 = \overline{PC}^2 = (x-a)^2 + y^2$$

It is assumed for the following calculations that (a) line-of-sight Friis propagation model, inverse square law of distance applies, (b) that isotropic transmit and receive antennas are used, (c) that additive Gaussian noise is present and (d) there is no a priori knowledge of power radiated by transmitter P at (x, y).

Let $n_0$ and $n_1$ be uncorrelated zero-mean Gaussian random variables with standard deviations $\sigma_0$ and $\sigma_1$, respectively. By the above assumptions (a)-(c), the signal strength measurements are expressible as:

$$s = m + n \text{ where} \tag{1a}$$

$$s \equiv \begin{bmatrix} s_0 \\ s_1 \end{bmatrix}, \quad m \equiv \begin{bmatrix} m_0 \\ m_1 \end{bmatrix} = \alpha \begin{bmatrix} \frac{1}{d_0^2} \\ \frac{1}{d_1^2} \end{bmatrix} = \alpha \begin{bmatrix} \frac{1}{(x+a)^2 + y^2} \\ \frac{1}{(x-a)^2 + y^2} \end{bmatrix}$$

$$\text{and } n \equiv \begin{bmatrix} n_0 \\ n_1 \end{bmatrix}, \Lambda \equiv E(n^T n) = \begin{bmatrix} \sigma_0^2 & 0 \\ 0 & \sigma_1^2 \end{bmatrix} \tag{1b}$$

Given a (known, fixed receiver locations) and noise covariance ($\Lambda$), the quantities to be estimated are $\alpha$ (which is related to the power radiated by the transmitter and antennae directivities) and the transmitter location (x, y). The likelihood of s, conditioned upon m, is $$p(s|m) = \frac{1}{2\pi\sqrt{|\Lambda|}} \exp\left[-\frac{1}{2}\|s-m\|_{\Lambda^{-1}}^2\right] = \frac{1}{2\pi\sqrt{|\Lambda|}} \exp\left[-\frac{1}{2}(s-m)^T \Lambda^{-1}(s-m)\right] \tag{2}$$

where $\|(\cdot)\|_{\Lambda^{-1}}^2 \equiv (\cdot)^T \Lambda^{-1}(\cdot)$ denotes the Euclidean norm with respect to the (positive-definite) fundamental metric tensor $\Lambda^{-1}$. The log-likelihood of s, conditioned upon m, is therefore expressible as:

$$\ln p(s|m) = -\frac{1}{2}\|s-m\|_{\Lambda^{-1}}^2 - \ln(2\pi\sqrt{|\Lambda|}) \tag{3}$$

The maximum-likelihood (ML) criterion selects that value $m = \hat{m}$ which maximizes the likelihood function given by equation (2). Since the likelihood function is decreasing in the argument of the exponential, this is equivalent to minimizing the following sufficient statistics $$\eta(m(x, y; \alpha)) \equiv \|s - m(x, y; \alpha)\|_{\Lambda^{-1}}^2 \geq 0 \tag{4a}$$

(Euclidean separation between $s$ and $m(x, y; \alpha)$)

$$\eta(m(x,y,\alpha)) \geq \eta(\hat{m}(x,y;\alpha)) \geq 0; \text{ for all feasible } m(x,y;\alpha) \tag{4b}$$

Since the sufficient statistics is non-negative, the absolute best case happens when the global minimum occurs at the lower bound, namely zero. If that is possible, then the ML solution must be $\hat{m} = s$ since $\Lambda^{-1}$ is positive definite. Now we determine the conditions under which the sufficient statistics vanishes at the ML solution. Equation (4a) is rewritten:

$$\eta(m(x, y; \alpha)) \equiv \alpha^2 \left\| \frac{s}{\alpha} - u(x, y) \right\|_{\Lambda^{-1}}^2 \tag{5}$$

$$\text{where } u(x, y) \equiv \frac{m}{\alpha} = \begin{bmatrix} u_0 \\ u_1 \end{bmatrix} = \begin{bmatrix} \frac{1}{d_0^2} \\ \frac{1}{d_1^2} \end{bmatrix} = \alpha \begin{bmatrix} \frac{1}{(x+a)^2 + y^2} \\ \frac{1}{(x-a)^2 + y^2} \end{bmatrix}$$

Since $u_0$ and $u_1$ are parametrically related via (x,y), it may not be prudent to expect that, for arbitrary values of s, the ML solution can be determined from $u(\hat{x}, \hat{y}) \equiv s/\hat{\alpha}$ where the sufficient statistics vanishes. Proper consideration requires the determination of the relationship between $u_0$ and $u_1$, as follows $$d_0^2 - d_1^2 = 4ax \text{ where } -(d_0 + a) \leq x \leq d_0 - a \tag{6a}$$

$$\Rightarrow -(d_0 + a) \leq \frac{d_0^2 - d_1^2}{4a} \leq d_0 - a \Rightarrow (d_0 - 2a)^2 \leq d_1^2 \leq (d_0 + 2a)^2 \tag{6b}$$

But $u_0 \equiv 1/d_0^2$ and $u_1 \equiv 1/d_1^2$; therefore, $$\frac{u_0}{(1 + 2a\sqrt{u_0})^2} \leq u_1 \leq \frac{u_0}{(1 - 2a\sqrt{u_0})^2} \tag{7}$$

Inequalities (7) describe a region on the ($u_0$, $u_1$) plane which gives all feasible vectors u (x, y). On the ($u_0$, $u_1$) plane, the term $s/\alpha$ in equation (5) represents a straight line from the origin passing through s.

Figure 7:
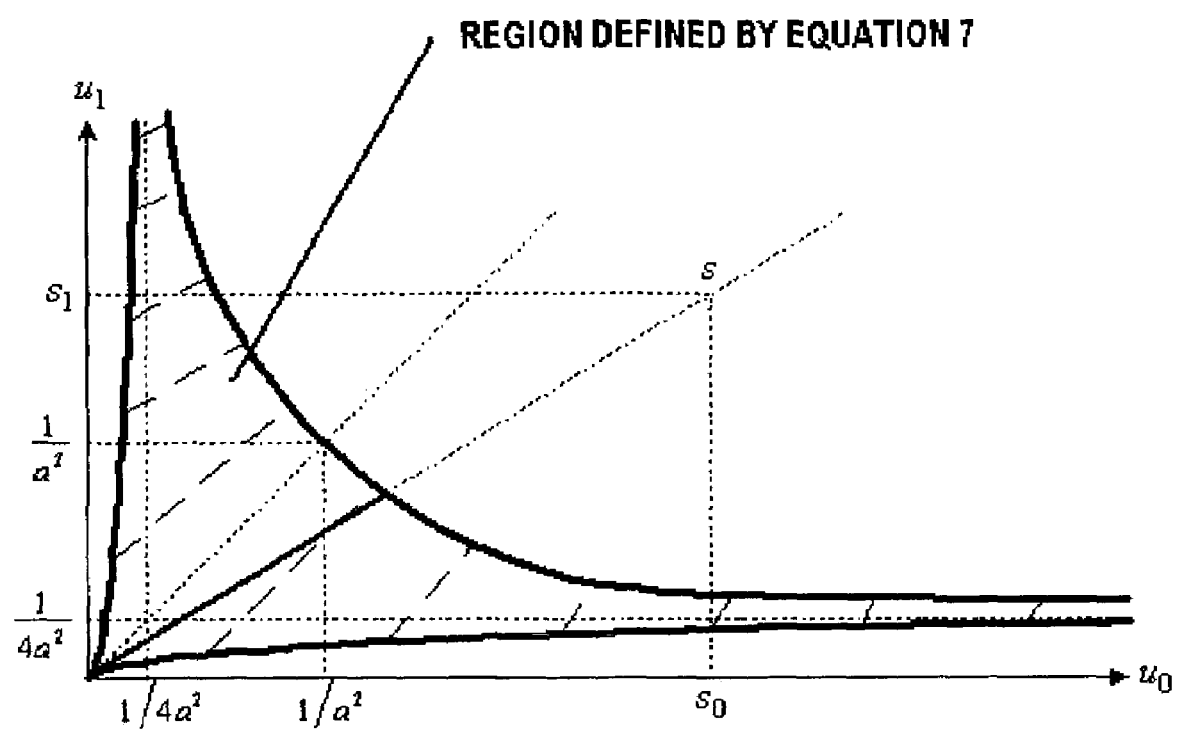
FIG. 7 is a graph showing the relation of inverse distance squared.

For a given value of $s = [s_0, s_1]^T$, the sufficient statistics vanishes at the ML solution, which is determined by $u(\hat{x}, \hat{y}) \equiv s/\hat{\alpha}$ (or equivalently $\hat{m} \equiv s$), if and only if the straight line defined by $s/\alpha$ penetrates the region defined by (7) on the ($u_0$, $u_1$) plane. This is always possible for arbitrary values of s, as shown in FIG. 7. Furthermore, FIG. 7 also reveals that there are infinitely many such ML solutions for a given measurement s.

Thus, it is concluded that the sufficient statistics defined in (4a) must necessarily and sufficiently vanish at the ML solution, for all measurements s.

Let $\psi \equiv s_0/s_1 \geq 0$, then:

$$\hat{m} = s \Rightarrow \psi = \frac{s_1}{s_0} = \frac{m_1}{m_0} = \frac{d_0^2}{d_1^2} = \frac{(\hat{x}+a)^2 + \hat{y}^2}{(\hat{x}-a)^2 + \hat{y}^2} \tag{8a}$$

Thus, $$\left(\hat{x} - \frac{\psi+1}{\psi-1}a\right)^2 + \hat{y}^2 = \left(\frac{\sqrt{\psi}}{\psi-1}2a\right)^2 \text{ where } \psi \equiv \frac{s_1}{s_0} \geq 0$$

and, therefore, $$\hat{\alpha} = 4\frac{s_1 a \hat{x}}{\psi - 1} = 4\frac{s_1 s_0}{s_1 - s_0}a\hat{x} \geq 0 \tag{8b}$$

Eq. (8a) shows that for all $\psi \geq 0$ there are infinitely many equi-probable ML solutions, all of which are distributed on a circle centered at $(x_0, 0) \equiv \left(\frac{\psi+1}{\psi-1}a, 0\right)$ with radius $R_0 \equiv \frac{\sqrt{\psi}}{|\psi-1|}2a$, where the sufficient statistics vanishes. Furthermore, associated with every feasible value of $\hat{\alpha}$, there are two ML solutions which are symmetrical around the x-axis as shown in FIG. 6.

The following can be deduced from equations (8a)-(8b)

$$|\hat{y}| \leq R_0, \forall \hat{x} \text{ where } R_0 = \frac{\sqrt{\psi}}{|\psi-1|}2a \quad (9a)$$

$$\begin{cases} \frac{\sqrt{\psi}-1}{\sqrt{\psi}+1}a \leq \hat{x} \leq \frac{\sqrt{\psi}+1}{\sqrt{\psi}-1}a; \text{ for } \psi \geq 1 \\ \frac{\sqrt{\psi}+1}{\sqrt{\psi}-1}a \leq \hat{x} \leq \frac{\sqrt{\psi}-1}{\sqrt{\psi}+1}a; \text{ for } \psi \leq 1 \end{cases} ; \forall \hat{y} \quad (9b)$$

$$\left(\frac{2a}{\sqrt{\psi}+1}\right)^2 s_1 \leq \hat{\alpha} \leq \left(\frac{2a}{\sqrt{\psi}-1}\right)^2; \psi \geq 0 \text{ and } \forall (\hat{x}, \hat{y}) \quad (9c)$$

An example of the locus of ML solutions for $\psi>1$ is shown in FIG. 6. For $\psi<1$, the circle would be to the left of the y-axis. The locus becomes the y-axis when $\psi=1$, which is the limit of the circle as $\psi \to 1$ as we would expect. Let B and D be the x-intercepts of the circle. In other words, B and D represent the ML solutions on the x-axis corresponding to a given value of $\psi$. Note that the four (colinear) points (A, B, C, D) form a harmonic division since $$\frac{\overline{BA}}{\overline{BC}} = \frac{\overline{DA}}{\overline{DC}} = \sqrt{\psi}.$$

By fundamental properties of harmonic divisions, the beam formed by (PA, PB, PC, PD) is a harmonic beam, any four-point cross-section of which forms a harmonic division. The locus of ML solutions is also the locus of vertices from which BA and BC subtend the same angles. In other words, the ray PB always bisects $\angle APC$. The ML solutions do not depend on the noise power. The error covariance does, however. We know from classic analytic geometry that conic sections such as circles, parabolae and hyperbolae can be constructed by knowledge of distances from points on such curves to fixed points (foci) or lines (directrices). In that light, aside from the usual definitions, a circle can be alternatively defined as the locus of points the distances from which to two fixed points form a constant ratio. These circles are commonly referred to as Apollonius circles.

ML solutions are determined from the criterion $\hat{m}=s$. Consider $$E\{(\hat{m}-m)(\hat{m}-m)^T\} = E\{(s-m)(s-m)^T\} = E\{nn^T\} = \Lambda \text{(noise covariance!)} \quad (10)$$

The information given by eq. (10) is not quite what we are after. That which we are really interested in is the error covariance on the x-y plane, i.e.

$$E\left\{\begin{bmatrix}\hat{x}-x\\\hat{y}-y\end{bmatrix}[\hat{x}-x \quad \hat{y}-y]\right\} \geq J^{-1} \text{ where} \quad (11a)$$

$$J = E\{[\nabla_{(x,y)}\ln p(s|m(x,y))][\nabla_{(x,y)}\ln p(s|m(x,y))]^T\} \quad (11b)$$

J is commonly referred to as the Fisher's information matrix. To evaluate eq. (11), apply the chain rule as follows:

$$\nabla_{(x,y)}\ln p(s|m(x,y)) = \nabla_{(x,y)}m^T(x,y) \cdot \nabla_m \ln p(s|m(x,y)) \quad (12)$$

where $$\nabla_{(x,y)}m^T(x,y) = \begin{bmatrix}\frac{\partial m_0}{\partial x} & \frac{\partial m_1}{\partial x}\\\frac{\partial m_0}{\partial y} & \frac{\partial m_1}{\partial y}\end{bmatrix} = -2\begin{bmatrix}\frac{x+a}{d_0^2} & \frac{x-a}{d_1^2}\\\frac{y}{d_0^2} & \frac{y}{d_1^2}\end{bmatrix}\begin{bmatrix}m_0 & 0\\0 & m_1\end{bmatrix} \quad (13a)$$

and $$\nabla_m \ln p(s|m(x,y)) = \Lambda^{-1}[s-m(x,y)] \quad (13b)$$

Substitute equations (13a)-(13b) into equation (12), we have $$\nabla_{(x,y)}\ln p(s|m(x,y)) = -2\begin{bmatrix}\frac{x+a}{d_0^2} & \frac{x-a}{d_1^2}\\\frac{y}{d_0^2} & \frac{y}{d_1^2}\end{bmatrix}\begin{bmatrix}m_0 & 0\\0 & m_1\end{bmatrix}\Lambda^{-1}[s-m(x,y)] \quad (14)$$

Finally, substitute equation (14) into (11a)-(11b), the error covariance is given by $$E\left\{\begin{bmatrix}\hat{x}-x\\\hat{y}-y\end{bmatrix}[\hat{x}-x \quad \hat{y}-y]\right\} \geq$$

$$\frac{1}{4}\begin{bmatrix}\left(\frac{m_0}{\sigma_0}\right)^2\left(\frac{x+a}{d_0^2}\right)^2+\left(\frac{m_1}{\sigma_1}\right)^2\left(\frac{x-a}{d_1^2}\right)^2 & \left(\frac{m_0}{\sigma_0}\right)^2\frac{y(x+a)}{d_0^4}+\left(\frac{m_1}{\sigma_1}\right)^2\frac{y(x-a)}{d_1^4}\\\left(\frac{m_0}{\sigma_0}\right)^2\frac{y(x+a)}{d_0^4}+\left(\frac{m_1}{\sigma_1}\right)^2\frac{y(x-a)}{d_1^4} & \left(\frac{m_0}{\sigma_0}\right)^2\left[\frac{y}{d_0^2}\right]^2+\left(\frac{m_1}{\sigma_1}\right)^2\left(\frac{y}{d_1^2}\right)^2\end{bmatrix}^{-1}$$

Since J is a low-order ($2\times2$) matrix, it is not difficult to compute the inverse. We have, $$|J| = \left(\frac{m_0}{\sigma_0} \cdot \frac{m_1}{\sigma_1} \cdot \frac{8ay}{d_0^2 d_1^2}\right)^2; J^{-1} = \frac{1}{|J|}\begin{bmatrix}J_{22} & -J_{12}\\-J_{21} & J_{11}\end{bmatrix}; \quad (15)$$

$$E\{(x-\hat{x})^2\} \geq J_{11}^{-1}; E\{(y-\hat{y})^2\} \geq J_{22}^{-1}$$

$$\frac{E\{(x-\hat{x})^2\}}{a^2} \geq \frac{(d_1/2a)^4}{(m_1/\sigma_1)^2} + \frac{(d_0/2a)^4}{(m_0/\sigma_0)^2};$$

$$\frac{E\{(y-\hat{y})^2\}}{a^2} \geq \left(\frac{x+a}{y}\right)^2\frac{(d_1/2a)^4}{(m_1/\sigma_1)^2} + \left(\frac{x-a}{y}\right)^2\frac{(d_0/2a)^4}{(m_0/\sigma_0)^2}$$

$$\frac{E\{(x-\hat{x})^2(y-\hat{y})^2\}}{a^2} \geq \frac{J_{11}^{-1}+J_{22}^{-1}}{a^2} =$$

$$\left(\frac{d_0 d_1}{2ay}\right)^2\left[\left(\frac{d_1/2a}{m_1/\sigma_1}\right)^2 + \left(\frac{d_0/2a}{m_0/\sigma_0}\right)^2\right]$$

Note that the quantities $m_0/\sigma_0$ and $m_1/\sigma_1$ represent the familiar signal-to-noise ratios. The error covariance is indeed a decreasing function of the signal-to-noise ratios, as expected.

Figure 8:
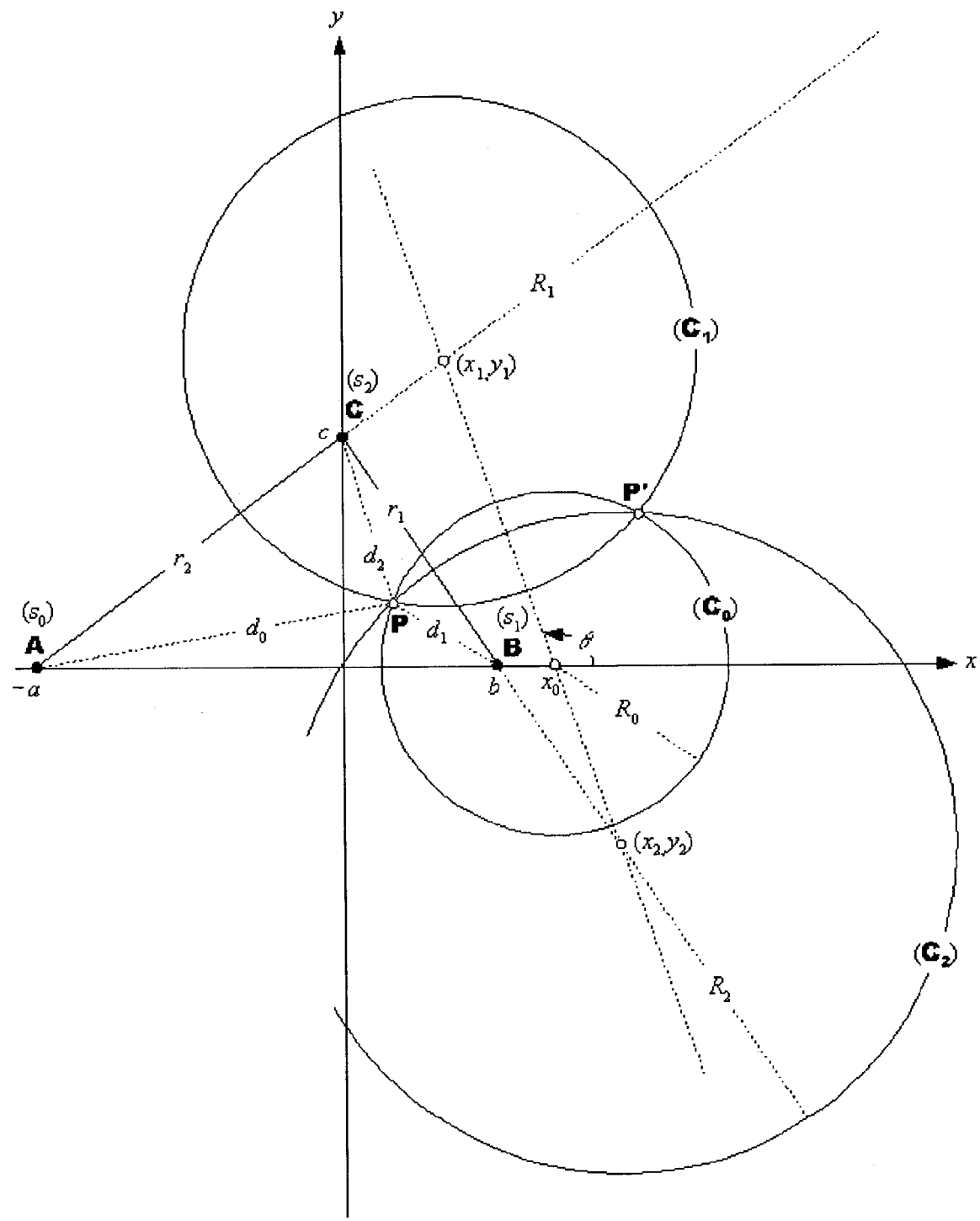
FIG. 8 is a diagram illustrating localization using signal strength ratio for three fixed devices.

The system geometry for three receivers is shown in FIG. 8 where P is a transmitter at (x, y), A, B and C are three receivers at $(-a, 0)$, $(b, 0)$ and $(0, c)$ which receive transmission from P with signal power measurements $s_0$, $s_1$ and $s_2$, respectively. Defining the following quantities:

$$\psi_1 \equiv s_1/s_0 \geq 0 \text{ and } \psi_2 \equiv s_2/s_0 \geq 0$$

$$d_0^2 \equiv \overline{PA}^2 = (x+a)^2 + y^2; \; d_1^2 \equiv \overline{PB}^2 = (x-b)^2 + y^2 \text{ and } d_2^2 \equiv \overline{PC}^2 \times x^2 + (y-c)^2$$

The distances between receiver pairs are given by:

$$r_0 \equiv \overline{AB} = a+b; \; r_1 \equiv \overline{BC} = \sqrt{b^2+c^2} \text{ and } r_2 \equiv \overline{CA} \sqrt{a^2+c^2}$$

Operating under the same assumptions as in the two-receiver case, let:

$$s \equiv \begin{bmatrix} s_0 \\ s_1 \\ s_2 \end{bmatrix}, \; m \equiv \begin{bmatrix} m_0 \\ m_1 \\ m_2 \end{bmatrix} = \alpha \begin{bmatrix} \frac{1}{d_0^2} \\ \frac{1}{d_1^2} \\ \frac{1}{d_2^2} \end{bmatrix} = \alpha \begin{bmatrix} \frac{1}{(x+\alpha)^2 + y^2} \\ \frac{1}{(x-b)^2 + y^2} \\ \frac{1}{x^2 + (y-c)^2} \end{bmatrix},$$

$$n \equiv \begin{bmatrix} n_0 \\ n_1 \\ n_2 \end{bmatrix}, \; \Lambda \equiv E(n^T n) = \begin{bmatrix} \sigma_0^2 & 0 & 0 \\ 0 & \sigma_1^2 & 0 \\ 0 & 0 & \sigma_2^2 \end{bmatrix}$$

Following exactly the same arguments as in the two-receiver case, the maximum-likelihood criterion selects that value $m = \hat{m}$ which minimizes the sufficient statistics given by (4a), i.e.:

$$\eta(m(x, y; \alpha)) \equiv \|s - m(x, y; \alpha)\|_{\Lambda^{-1}}^2 \geq 0$$

(Euclidean separation between s and $m(x,y;\alpha)$)

$$\eta(m(x,y;\alpha)) \geq \eta(\hat{m}(x,y;\alpha)) \geq 0;$$

for all feasible $m(x,y;\alpha)$

Utilizing results for the two-receiver configuration, there are at most two ML solutions at which the sufficient statistics vanishes. As illustrated in FIG. 8, these solutions must be at the intersection of the following circles:

$$(C_0): \; (\hat{x} - x_0)^2 + \hat{y}^2 = R_0^2 \text{ where } x_0 = \frac{b\psi_1 + a}{\psi_1 - 1};$$

$$R_0 = \frac{\sqrt{\psi_1}}{|\psi_1 - 1|} r_0; \; \psi_1 = \frac{s_1}{s_0}$$

$$(C_1): \; (\hat{x} - x_1)^2 + (\hat{y} - y_1)^2 = R_1^2 \text{ where } x_1 = \frac{a}{\psi_2 - 1};$$

$$y_1 = \frac{c\psi_2}{\psi_2 - 1}; \; R_1 = \frac{\sqrt{\psi_2}}{|\psi_2 - 1|} r_2; \; \psi_2 = \frac{s_2}{s_0}$$

$$(C_2): \; (\hat{x} - x_2)^2 + (\hat{y} - y_2)^2 = R_2^2 \text{ where } x_2 = \frac{b\psi_1}{\psi_1 - \psi_2};$$

$$y_2 = -\frac{c\psi_2}{\psi_1 - \psi_2}; \; R_2 = \frac{\sqrt{\psi_1 \psi_2}}{|\psi_1 - \psi_2|} r_1$$

It is clear that $(C_0)$, $(C_1)$ and $(C_2)$ do not necessarily pair-wise intersect for all values of $\psi_1$ and $\psi_2$. If the circles do pair-wise intersect, however, then all three circles must intersect each other at the same point(s). Under any circumstances, the centers of these circles are always co-linear with slope $\tan\theta = c\psi_2(\psi_1-1)/[r_0\psi_1-(b\psi_1+a)\psi_2]$ as shown in FIG. 8.

In order to identify $(\hat{x},\hat{y})$ at which the sufficient statistics vanishes, we only need compute the intersection of two circles, say $(C_0)$ and $(C_1)$. Let D be the distance between the centers of $(C_0)$ and $(C_1)$, i.e.

$$D^2 = (x_1 - x_0)^2 + y_1^2 = \frac{[r_0\psi_1 - (b\psi_1 + a)\psi_2]^2 + c^2\psi_2^2(\psi_1 - 1)^2}{(\psi_1 - 1)^2(\psi_2 - 1)^2} \quad (16)$$

Let $\theta$ be the angle from the x-axis to the line passing through the centers of the circles, in the counter-clockwise direction as shown in FIG. 8, then:

$$\cos\theta = \frac{x_1 - x_0}{D}; \; \sin\theta = \frac{y_1}{D} \quad (17)$$

To ease the algebra, let $(x',y')$ be the new coordinate system generated by translating $(x,y)$ to the center of $(C_0)$ at $(x_0, 0)$, followed by counter-clockwise rotation by the angle $\theta - \pi$ radians.

$$\begin{bmatrix} x \\ y \end{bmatrix} = \begin{bmatrix} x_0 \\ 0 \end{bmatrix} - \begin{bmatrix} \cos\theta & -\sin\theta \\ \sin\theta & \cos\theta \end{bmatrix} \begin{bmatrix} x' \\ y' \end{bmatrix} \text{ or } \quad (18)$$

$$\begin{bmatrix} x - x_0 \\ y \end{bmatrix} = -\begin{bmatrix} \cos\theta & -\sin\theta \\ \sin\theta & \cos\theta \end{bmatrix} \begin{bmatrix} x' \\ y' \end{bmatrix}$$

Note that in the new coordinate system $(x',y')$, the centers of $(C_0)$ and $(C_1)$, respectively, are represented by $(x_0',y_0') = (0, 0)$ and $(x_1',y_1') = (-D, 0)$. Solve for $(\hat{x}',\hat{y}')$ we arrive at:

$$\begin{bmatrix} \hat{x}' \\ \hat{y}' \end{bmatrix} = \frac{1}{2D} \begin{bmatrix} R_1^2 - R_0^2 - D^2 \pm \\ \sqrt{4D^2 R_0^2 - (R_1^2 - R_0^2 - D^2)^2} \end{bmatrix} = \quad (19)$$

$$\frac{1}{2D} \begin{bmatrix} R_1^2 - R_0^2 - D^2 \pm \\ \sqrt{2(R_1^2 R_0^2 + R_0^2 D^2 + D^2 R_1^2) - (R_1^4 + R_0^4 + D^4)} \end{bmatrix}$$

wherein it is required that $4D^2 R_0^2 \geq (R_1^2 - R_0^2 - D^2)^2$

Substitute (19) into (18), we obtain $$\begin{bmatrix} \hat{x} \\ \hat{y} \end{bmatrix} = \begin{bmatrix} x_0 \\ 0 \end{bmatrix} - \quad (20)$$

$$\frac{1}{2D^2} \begin{bmatrix} x_1 - x_0 & -y_1 \\ y_1 & x_1 - x_0 \end{bmatrix} \begin{bmatrix} R_1^2 - R_0^2 - D^2 \pm \\ \sqrt{4D^2 R_0^2 - (R_1^2 - R_0^2 - D^2)^2} \end{bmatrix}$$

where we stipulate that $\psi_1$ and $\psi_2$ must be such that the following constraints (in equivalent forms) are satisfied:

$$4D^2R_0^2 \geq (R_1^2-R_0^2-D^2)^2 \Leftrightarrow 2(R_1^2R_0^2+R_0^2D^2+D^2R_1^2) \geq R_1^4+R_0^4+D^4 \Leftrightarrow |D^2-(R_1^2+R_0^2)| \leq 2R_1R_0 \Leftrightarrow |R_1-R_0| \leq D \leq R_1+R_0 \quad (21)$$

The constraint on $\psi_1$ and $\psi_2$ expressed by (21) implies that not all ML solutions can be represented by eq. (20). Those which are represented by eq. (20), however, guarantee that the sufficient statistics is zero. That is, the sufficient statistics does not necessarily vanish at every ML solution. This is in contrast with the two-receiver case where the sufficient statistics must necessarily and sufficiently vanish at every ML solution.

In cases where $\psi_1$ and $\psi_2$ fail to satisfy constraint (21), algebraic methods appear intractable. Numerical techniques must be employed to compute the ML solutions. These solutions, while maximizing the likelihood function, do not guarantee that the sufficient statistics is zero.

The solutions given by (20) and (21) contain singularities at $\psi_1=1$, $\psi_2=1$, $\psi_1=0$ and $\psi_2=0$. The solutions can still be correctly determined under these conditions by applications of L'Hôpital's rule. To ease computational difficulties at these singularities, those special cases are given below:

$$\lim_{\substack{\psi_1 \to 1 \\ \psi_2 \neq 1}} \begin{bmatrix} \hat{x} \\ \hat{y} \end{bmatrix} = \begin{bmatrix} \dfrac{b-a}{2} \\ \dfrac{2c\psi_2 \pm \sqrt{4r_2^2\psi_2 - [(b-a)\psi_2 - r_0]^2}}{2(\psi_2-1)} \end{bmatrix} \text{ where } 4r_2^2\psi_2 - [(b-a)\psi_2 - r_0]^2 \geq 0 \quad (22a)$$

$$\lim_{\substack{\psi_2 \to 1 \\ \psi_1 \neq 1}} \begin{bmatrix} \hat{x} \\ \hat{y} \end{bmatrix} = \begin{bmatrix} \dfrac{\gamma(\psi_1) \pm \sqrt{\gamma^2(\psi_1) - r_2^2(\psi_1-1)[(c^2-a^2)^2(\psi_1-1) + 4c^2(b^2\psi_1 - a^2)]}}{2r_2^2(\psi_1-1)} \\ \dfrac{-2a\hat{x} + c^2 - a^2}{2c} \end{bmatrix} \quad (23)$$

where $\gamma(\psi_1) \equiv 2c^2(b\psi_1+a)+a(c^2-a^2)(\psi_1-1)$ (23b)

and $\gamma^2(\psi_1)-r_2^2(\psi_1-1)[(c^2-a^2)^2(\psi_1-1)+4c^2(b^2\psi_1-a^2)] \geq 0$ (23c)

$$\lim_{\substack{\psi_1 \to 1 \\ \psi_2 \to 1}} \begin{bmatrix} \hat{x} \\ \hat{y} \end{bmatrix} = \begin{bmatrix} \dfrac{b-a}{2} \\ \dfrac{c^2-ab}{2c} \end{bmatrix} \text{ and a trivial solution at } \infty \quad (24)$$

$$\lim_{\substack{\psi_1 \to 0 \\ \psi_2 \to 0}} \begin{bmatrix} \hat{x} \\ \hat{y} \end{bmatrix} = \begin{bmatrix} -a \\ 0 \end{bmatrix} \quad (25)$$

If $\psi_1$ and $\psi_2$ fail to satisfy constraint (21), ML solutions of the form given by eq. (20) do not exist. The sufficient statistics cannot vanish at the ML solutions in this case. To solve the problem under these conditions, we seek that estimate $(\hat{x},\hat{y})$ and the associated parameter $\hat{\alpha}$ at which the gradient of the sufficient statistics vanishes, i.e.

$$\nabla_{(x,y,\alpha)} \eta(x,y,\alpha)|_{(\hat{x},\hat{y},\hat{\alpha})} = 0 \text{ where } \eta(x,y,\alpha) = \|s-m(x,y;\alpha)\|_{\Lambda^{-1}}^2 \quad (26a)$$

and $m(x,y;\alpha) = [m_0 m_1 m_2]^T = \alpha[d_0^{-2}(x,y) d_1^{-2}(x,y) d_2^{-2}(x,y)]^T$ (26b)

By chain rule, $$\nabla_{(x,y,\alpha)} \eta(x,y,\alpha) = \nabla_{(x,y,\alpha)} m^T(x,y;\alpha) \cdot \nabla_m \eta(m) \text{ where} \quad (27a)$$

$$\nabla_{(x,y,\alpha)} m^T(x,y,\alpha) = \begin{bmatrix} \dfrac{\partial m_0}{\partial x} & \dfrac{\partial m_1}{\partial x} & \dfrac{\partial m_2}{\partial x} \\ \dfrac{\partial m_0}{\partial y} & \dfrac{\partial m_1}{\partial y} & \dfrac{\partial m_2}{\partial y} \\ \dfrac{\partial m_0}{\partial \alpha} & \dfrac{\partial m_1}{\partial \alpha} & \dfrac{\partial m_2}{\partial \alpha} \end{bmatrix} \quad (27b)$$

$$= -2 \begin{bmatrix} \alpha \dfrac{x+a}{d_0^4(x,y)} & \alpha \dfrac{x-b}{d_1^4(x,y)} & \alpha \dfrac{x}{d_2^4(x,y)} \\ \alpha \dfrac{y}{d_0^4(x,y)} & \alpha \dfrac{y}{d_1^4(x,y)} & \alpha \dfrac{y-c}{d_2^4(x,y)} \\ -\dfrac{1}{2d_0^2(x,y)} & -\dfrac{1}{2d_1^2(x,y)} & -\dfrac{1}{2d_2^2(x,y)} \end{bmatrix}$$

$$\nabla_m \eta(m) = 2\Lambda^{-1}[m(x,y;\alpha)-s] \quad (27c)$$

Substitute (27b)-(27c) into (27a) to obtain the gradient of the sufficient statistics, then set the resultant to zero according to eq. (26a):

$$\begin{bmatrix} \hat{\alpha}\dfrac{\hat{x}+a}{\sigma_0^2 d_0^4(\hat{x},\hat{y})} & \hat{\alpha}\dfrac{\hat{x}-b}{\sigma_1^2 d_1^4(\hat{x},\hat{y})} & \hat{\alpha}\dfrac{\hat{x}}{\sigma_2^2 d_2^4(\hat{x},\hat{y})} \\ \hat{\alpha}\dfrac{\hat{y}}{\sigma_0^2 d_0^4(\hat{x},\hat{y})} & \hat{\alpha}\dfrac{\hat{y}}{\sigma_1^2 d_1^4(\hat{x},\hat{y})} & \hat{\alpha}\dfrac{\hat{y}-c}{\sigma_2^2 d_2^4(\hat{x},\hat{y})} \\ -\dfrac{1}{2\sigma_0^2 d_0^2(\hat{x},\hat{y})} & -\dfrac{1}{2\sigma_1^2 d_1^2(\hat{x},\hat{y})} & -\dfrac{1}{2\sigma_2^2 d_2^2(\hat{x},\hat{y})} \end{bmatrix} \begin{bmatrix} s_0 - \dfrac{\hat{\alpha}}{d_0^2(\hat{x},\hat{y})} \\ s_1 - \dfrac{\hat{\alpha}}{d_1^2(\hat{x},\hat{y})} \\ s_2 - \dfrac{\hat{\alpha}}{d_2^2(\hat{x},\hat{y})} \end{bmatrix} = 0 \quad (28)$$

To improve computational efficiency, we can easily eliminate $\hat{\alpha}$ using the third equation in (28) and the system of equations is reduced to:

$$\begin{bmatrix} \dfrac{\hat{x}+a}{\sigma_0^2 d_0^4(\hat{x},\hat{y})} & \dfrac{\hat{x}-b}{\sigma_1^2 d_1^4(\hat{x},\hat{y})} & \dfrac{\hat{x}}{\sigma_2^2 d_2^4(\hat{x},\hat{y})} \\ \dfrac{\hat{y}}{\sigma_0^2 d_0^4(\hat{x},\hat{y})} & \dfrac{\hat{y}}{\sigma_1^2 d_1^4(\hat{x},\hat{y})} & \dfrac{\hat{y}-c}{\sigma_2^2 d_2^4(\hat{x},\hat{y})} \end{bmatrix} \begin{bmatrix} s_0 - \beta(\hat{x},\hat{y})d_1^2(\hat{x},\hat{y})d_2^2(\hat{x},\hat{y}) \\ s_1 - \beta(\hat{x},\hat{y})d_2^2(\hat{x},\hat{y})d_0^2(\hat{x},\hat{y}) \\ s_2 - \beta(\hat{x},\hat{y})d_0^2(\hat{x},\hat{y})d_1^2(\hat{x},\hat{y}) \end{bmatrix} = 0 \text{ where} \quad (29a)$$

$$\beta(\hat{x},\hat{y}) \equiv \dfrac{s_0\sigma_1^2\sigma_2^2 d_1^2(\hat{x},\hat{y})d_2^2(\hat{x},\hat{y}) + s_1\sigma_2^2\sigma_0^2 d_2^2(\hat{x},\hat{y})d_0^2(\hat{x},\hat{y}) + s_2\sigma_0^2\sigma_1^2 d_0^2(\hat{x},\hat{y})d_1^2(\hat{x},\hat{y})}{\sigma_1^2\sigma_2^2 d_1^4(\hat{x},\hat{y})d_2^4(\hat{x},\hat{y}) + \sigma_2^2\sigma_0^2 d_2^4(\hat{x},\hat{y})d_0^4(\hat{x},\hat{y}) + \sigma_0^2\sigma_1^2 d_0^4(\hat{x},\hat{y})d_1^4(\hat{x},\hat{y})} \quad (29b)$$

$$\hat{\alpha}(\hat{x},\hat{y}) = \beta(\hat{x},\hat{y})d_0^2(\hat{x},\hat{y})d_1^2(\hat{x},\hat{y})d_2^2(\hat{x},\hat{y}) \quad (29c)$$

A Matlab subroutine employing algebraic root-solving methods may be written to solve for the ML solutions and the associated optimal value of $\hat{\alpha}$ from equations (29a)-(29c).

Following the same approach as in the two-receiver case, the first step is to determine the Fisher's information matrix defined by equation (11b). To evaluate the gradient of the log-likelihood function:

$$\nabla_{(x,y)} \ln p(s|m(x,y)) = \nabla_{(x,y)} m^T(x,y) \cdot \nabla_m \ln p(s|m(x,y)) \text{ where} \quad (30)$$

$$\nabla_{(x,y)} m^T(x,y) = \begin{bmatrix} \dfrac{\partial m_0}{\partial x} & \dfrac{\partial m_1}{\partial x} & \dfrac{\partial m_2}{\partial x} \\ \dfrac{\partial m_0}{\partial y} & \dfrac{\partial m_1}{\partial y} & \dfrac{\partial m_2}{\partial y} \end{bmatrix} = -2 \begin{bmatrix} \dfrac{x+a}{d_0^2(x,y)} & \dfrac{x-b}{d_1^2(x,y)} & \dfrac{x}{d_2^2(x,y)} \\ \dfrac{y}{d_0^2(x,y)} & \dfrac{y}{d_1^2(x,y)} & \dfrac{y-c}{d_2^2(x,y)} \end{bmatrix} \begin{bmatrix} m_0 & 0 & 0 \\ 0 & m_1 & 0 \\ 0 & 0 & m_2 \end{bmatrix}$$

and $\nabla_m \ln p(s|m(x,y)) = \Lambda^{-1}[s - m(x,y)]$

Substitute the last two expressions into eq. (30):

$$\nabla_{(x,y)} \ln p(s|m(x,y)) = -2 \begin{bmatrix} \dfrac{x+a}{d_0^2(x,y)} & \dfrac{x-b}{d_1^2(x,y)} & \dfrac{x}{d_2^2(x,y)} \\ \dfrac{y}{d_0^2(x,y)} & \dfrac{y}{d_1^2(x,y)} & \dfrac{y-c}{d_2^2(x,y)} \end{bmatrix} \begin{bmatrix} m_0 & 0 & 0 \\ 0 & m_1 & 0 \\ 0 & 0 & m_2 \end{bmatrix} \Lambda^{-1}[s-m(x,y)]$$

Substitute the last expression into eq. (11b), noting that $E\{[s-m(x,y)][s-m(x,y)]^T\} = \Lambda$, we arrive at the Fisher's information matrix J is:

$$J = 4\begin{bmatrix} J_{11} & J_{12} \\ J_{21} & J_{22} \end{bmatrix} \text{ where} \quad (31a)$$

$$J_{11} = \left(\dfrac{m_0}{\sigma_0}\right)^2 \left[\dfrac{x+a}{d_0^2(x,y)}\right]^2 + \left(\dfrac{m_1}{\sigma_1}\right)^2 \left[\dfrac{x-b}{d_1^2(x,y)}\right]^2 + \left(\dfrac{m_2}{\sigma_2}\right)^2 \left[\dfrac{x}{d_2^2(x,y)}\right]^2 \quad (31b)$$

-continued $$J_{22} = \left(\dfrac{m_0}{\sigma_0}\right)^2 \left[\dfrac{y}{d_0^2(x,y)}\right]^2 + \left(\dfrac{m_1}{\sigma_1}\right)^2 \left[\dfrac{y}{d_1^2(x,y)}\right]^2 + \left(\dfrac{m_2}{\sigma_2}\right)^2 \left[\dfrac{y-c}{d_2^2(x,y)}\right]^2 \quad (31c)$$

-continued $$J_{12} = J_{21} = \left(\frac{m_0}{\sigma_0}\right)^2 \frac{y(x+a)}{d_0^4(x,y)} + \left(\frac{m_1}{\sigma_1}\right)^2 \frac{y(x-b)}{d_1^4(x,y)} + \left(\frac{m_2}{\sigma_2}\right)^2 \frac{x(y-c)}{d_2^4(x,y)} \quad (31d)$$

The Cramer-Rao bound on the error covariance requires $J^{-1}$:

$$E\{(x-\hat{x})^2\} \geq J_{11}^{-1}; \; E\{(y-\hat{y})^2\} \geq J_{22}^{-1}; \; \text{where} \quad (32)$$

$$J^{-1} = \frac{4}{|J|}\begin{bmatrix} J_{22} & -J_{12} \\ -J_{21} & J_{11} \end{bmatrix} \text{ and}$$

$$|J| = 16\left\{\underbrace{\left[\frac{m_0}{\sigma_0} \cdot \frac{m_1}{\sigma_1} \cdot \frac{(a+b)y}{d_0^2 d_1^2}\right]^2}_{\text{Vanish for }(x,y) \in BA} + \underbrace{\left[\frac{m_1}{\sigma_1} \cdot \frac{m_2}{\sigma_2} \cdot \frac{cx+b(y-c)}{d_1^2 d_2^2}\right]^2}_{\text{Vanish for }(x,y) \in CB} + \underbrace{\left[\frac{m_2}{\sigma_2} \cdot \frac{m_0}{\sigma_0} \cdot \frac{cx-a(y-c)}{d_2^2 d_0^2}\right]^2}_{\text{Vanish for }(x,y) \in AC}\right\}$$

Thus:

$$E\{(x-\hat{x})^2\} \geq \frac{\left(\frac{m_0}{\sigma_0}\right)^2\left[\frac{y}{d_0^2}\right]^2 + \left(\frac{m_1}{\sigma_1}\right)^2\left[\frac{y}{d_1^2}\right]^2 + \left(\frac{m_2}{\sigma_2}\right)^2\left[\frac{y-c}{d_2^2}\right]^2}{4\left\{\left[\frac{m_0}{\sigma_0} \cdot \frac{m_1}{\sigma_1} \cdot \frac{(a+b)y}{d_0^2 d_1^2}\right]^2 + \left[\frac{m_1}{\sigma_1} \cdot \frac{m_2}{\sigma_2} \cdot \frac{cx+b(y-c)}{d_1^2 d_2^2}\right]^2 + \left[\frac{m_2}{\sigma_2} \cdot \frac{m_0}{\sigma_0} \cdot \frac{cx-a(y-c)}{d_2^2 d_0^2}\right]^2\right\}}$$

$$E\{(y-\hat{y})^2\} \geq \frac{\left(\frac{m_0}{\sigma_0}\right)^2\left[\frac{x+a}{d_0^2}\right]^2 + \left(\frac{m_1}{\sigma_1}\right)^2\left[\frac{x-b}{d_1^2}\right]^2 + \left(\frac{m_2}{\sigma_2}\right)^2\left[\frac{x}{d_2^2}\right]^2}{4\left\{\left[\frac{m_0}{\sigma_0} \cdot \frac{m_1}{\sigma_1} \cdot \frac{(a+b)y}{d_0^2 d_1^2}\right]^2 + \left[\frac{m_1}{\sigma_1} \cdot \frac{m_2}{\sigma_2} \cdot \frac{cx+b(y-c)}{d_1^2 d_2^2}\right]^2 + \left[\frac{m_2}{\sigma_2} \cdot \frac{m_0}{\sigma_0} \cdot \frac{cx-a(y-c)}{d_2^2 d_0^2}\right]^2\right\}}$$

$$E\{(x-\hat{x})^2 + (y-\hat{y})^2\} \geq \ldots$$

$$\ldots \frac{\left(\frac{m_0}{\sigma_0}\right)^2 \frac{1}{d_0^2} + \left(\frac{m_1}{\sigma_1}\right)^2 \frac{1}{d_1^2} + \left(\frac{m_2}{\sigma_2}\right)^2 \frac{1}{d_2^2}}{4\left\{\left[\frac{m_0}{\sigma_0} \cdot \frac{m_1}{\sigma_1} \cdot \frac{(a+b)y}{d_0^2 d_1^2}\right]^2 + \left[\frac{m_1}{\sigma_1} \cdot \frac{m_2}{\sigma_2} \cdot \frac{cx+b(y-c)}{d_1^2 d_2^2}\right]^2 + \left[\frac{m_2}{\sigma_2} \cdot \frac{m_0}{\sigma_0} \cdot \frac{cx-a(y-c)}{d_2^2 d_0^2}\right]^2\right\}}$$

The error covariance is a decreasing function of the signal-to-noise-ratios. A numerical example is given below:

Example: $\sigma_0 = \sigma_1 = \sigma_2$; a=82 ft; b=40 ft; c=60 ft

Consider the point O at $(x_c, y_c) = 0.5(b-a, c-ab/c)$, which is the center of the circle circumscribing the triangle ABC. This point is equi-distant to A, B and C. Denote this distance as $d_c$, then $$d_c^2 = \frac{1}{4}\left(a^2 + b^2 + c^2 + \frac{a^2 b^2}{c^2}\right)$$

The signal-to-noise ratio at A, B and C are $$(m_0/\sigma_0)^2|_o = (m_1/\sigma_1)^2|_o = (m_2/\sigma_2)^2|_o = \text{SNR}$$

The error variance at the point O is bounded by:

$$E\{(x_c - \hat{x}_c)^2 + (y_c - \hat{y}_c)^2\} \geq$$

$$\frac{3}{64 \cdot \text{SNR}} \cdot \frac{[c^2(a+b)^2 + (c^2-ab)^2]^3}{[(a+b)^2(c^2-ab)^2 + a^2(b^2+c^2)^2 + b^2(c^2+a^2)^2]c^4}$$

Moving away from point O to the position (x,y), the distances from which to A, B and C are $d_0'$, $d_1'$ and $d_2'$, respectively. Let:

$$\mu_0 = (d_c/d_0')^2; \; \mu_1 = (d_c/d_1')^2; \; \mu_2 = (d_c/d_2')^2$$

Then the error variance at (x,y), normalized to $d_c^2$, is bounded by $$E\{(x-\hat{x})^2 + (y-\hat{y})^2\}/d_c^2 \geq \ldots$$

$$\ldots \frac{\mu_0^2 + \mu_1^2 + \mu_2^2}{64 \cdot \text{SNR}} \cdot \frac{[(a+b)^2 + (c-ab/c)^2]^2}{\mu_0^3 \mu_1^3 [(a+b)y]^2 + \mu_1^3 \mu_2^3 [cx+b(y-c)]^2 + \mu_2^3 \mu_0^3 [cx-a(y-c)]^2}$$

Upon numerical substitution, the plot of normalized standard-deviation of error along the three lines which bisect AB, BC and CA at right angles is given below. The error bound increases rapidly outside the triangle ABC.

$$\text{SNR}=32 \Rightarrow \sqrt{E\{(x_c-\hat{x}_c)^2+(y_c-\hat{y}_c)^2\}} \geq 6.9 \text{ ft or}$$
$$\sqrt{E\{(x_c-\hat{x}_c)^2+(y_c-\hat{y}_c)^2\}}/d_c \geq 0.11$$

To compute location by a combination of signal strength and time of arrival using two receivers, the system geometry is essentially identical to that shown in FIG. 6. It is assumed that both received signal power and time-difference-of-arrival (TDoA) measurements are available. P is a transmitter at (x, y), A and C are two receivers at (−a, 0) and (a, 0) which receive transmission from P with signal power measurements $s_0$ and $s_1$, respectively. Let $\psi \equiv s_1/s_0 \geq 0$. Time diference of arrival is $\tau$. Let c be the (known) speed of EM wave propagation in air and define $\delta \equiv c\tau/2$. Note that $\delta$ represents half the difference between PA and PC. Additive Gaussian noise in both signal-power and TDoA measurements.

$$d_0^2 \equiv \overline{PA}^2 = (x+a)^2 + y^2 \text{ and } d_1^2 \equiv \overline{PC}^2 = (x-a)^2 + y^2$$

To compute maximum likelihood estimation using assumptions (a)-(c) above, let:

$$s \equiv \begin{bmatrix} s_0 \\ s_1 \\ \delta \end{bmatrix} = m + n, \text{ where}$$

$$m \equiv \begin{bmatrix} m_0 \\ m_1 \\ m_2 \end{bmatrix} = \begin{bmatrix} \frac{\alpha}{d_0^2} \\ \frac{\alpha}{d_1^2} \\ \frac{d_0 - d_1}{2} \end{bmatrix} = \begin{bmatrix} \frac{\alpha}{(x+\alpha)^2 + y^2} \\ \frac{\alpha}{(x-\alpha)^2 + y^2} \\ \frac{\sqrt{(x+\alpha)^2+y^2} - \sqrt{(x-\alpha)^2+y^2}}{2} \end{bmatrix}$$

$$\text{and } n \equiv \begin{bmatrix} n_0 \\ n_1 \\ n_2 \end{bmatrix}, \Lambda \equiv E(n^T n) = \begin{bmatrix} \sigma_0^2 & 0 & 0 \\ 0 & \sigma_1^2 & 0 \\ 0 & 0 & \sigma_2^2 \end{bmatrix}$$

The noise vector n is Gaussian by assumption. Note that elements of the (positive definite) noise covariance $\Lambda$ have different physical meanings. Whereas the dimension of $\sigma_0$ and $\sigma_1$ is signal-power, that of $\sigma_2$ is distance. Following exactly the same arguments as in previous analyses, the ML criterion selects that value $m = \hat{m}$ which minimizes the sufficient statistics given by (4a), i.e.:

$$\eta(m(x, y; \alpha)) \equiv \|s - m(x, y; \alpha)\|_{\Lambda^{-1}}^2 \geq 0$$

(Euclidean separation between s and m (x,y;α))

$$\eta(m(x,y;\alpha)) \geq \eta(\hat{m}(x,y;\alpha)) \geq 0;$$

for all feasible m(x,y;α)

To determine the conditions under which the sufficient statistics vanishes at the ML solution, the necessary and sufficient condition is $\hat{m} = s$ since $\Lambda$ is positive definite. In other words, $$\hat{\alpha} \begin{bmatrix} \frac{1}{(\hat{x}+a)^2 + \hat{y}^2} \\ \frac{1}{(\hat{x}-a)^2 + \hat{y}^2} \end{bmatrix} = \begin{bmatrix} s_0 \\ s_1 \end{bmatrix} \quad (33a)$$

$$\frac{\sqrt{(\hat{x}+a)^2 + \hat{y}^2} - \sqrt{(\hat{x}-a)^2 + \hat{y}^2}}{2} = \delta \quad (33b)$$

Equation (33b) represents one branch of a hyperbola with vertex at ($\delta$, 0), foci at (−a, 0) and (a, 0). Thus, the ML solution ($\hat{x},\hat{y}$) at which the sufficient statistics vanishes must lie on the right-hand branch of the hyperbola if $\delta > 0$, the left-hand branch of the hyperbola if $\delta < 0$, and the y-axis if $\delta = 0$. This hyperbola is denoted by (H) in FIG. 9, corresponding to an example where $\delta > 0$.

Drawing from previous results where only signal-power measurements are used in a localization system with two receivers (FIG. 1), equation (33a) represents the circle described by equation (8a). Thus, the ML solution ($\hat{x},\hat{y}$) at which the sufficient statistics vanishes must also lie on the Apollonius circle defined by the points A, C and the harmonic division ratio $\sqrt{\psi} = \sqrt{s_1/s_0}$. This circle is denoted by (L) in FIG. 9, corresponding to an example where $\psi > 1$.

Figure 9:
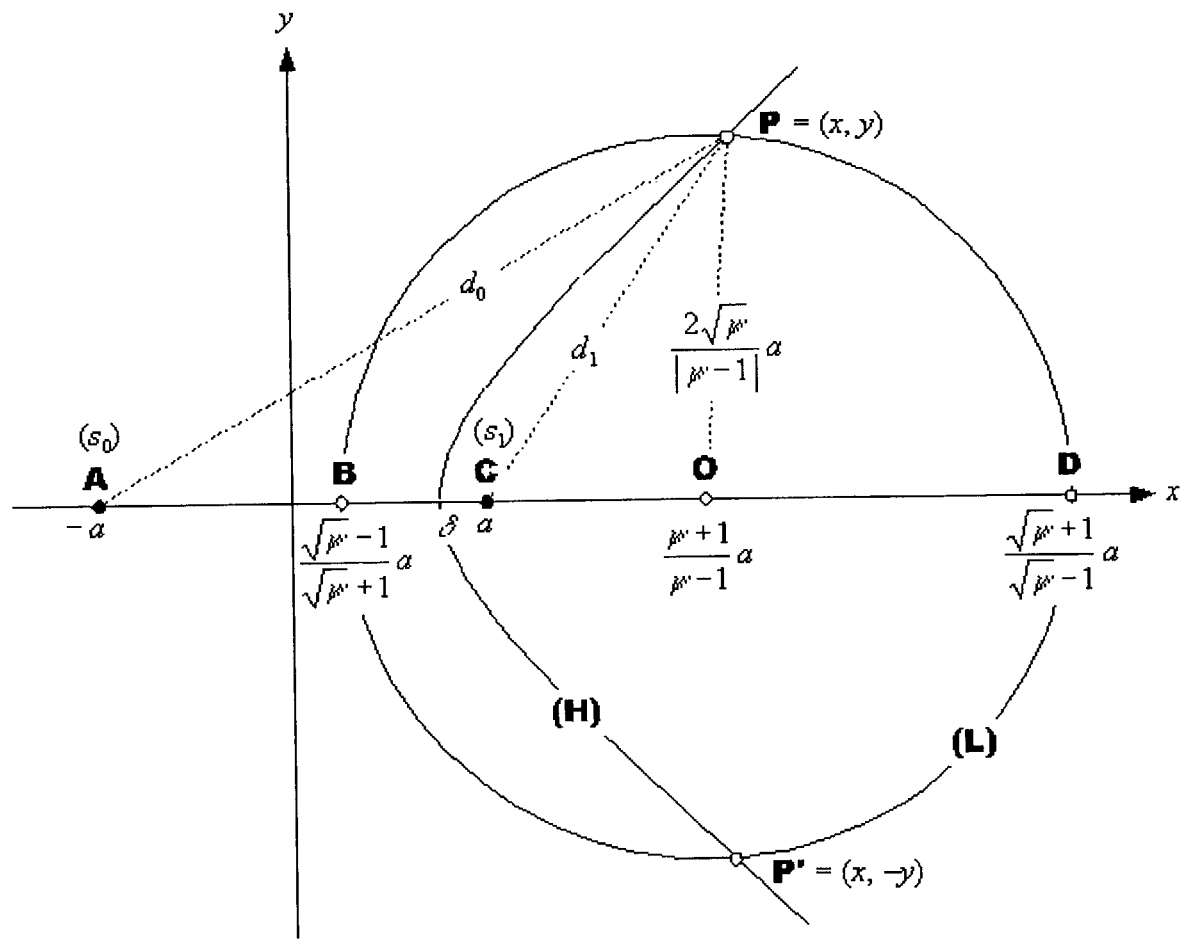
FIG. 9 is a diagram illustrating localization using signal strength ratio and time difference of arrival for two fixed devices.

Combining the two facts stated above, there are at most two ML solutions at which the sufficient statistics vanishes. As illustrated in FIG. 9, these solutions must be at the intersection of the circle (L) and the hyperbola (H) described below $$(L): (\hat{x} - x_0)^2 + \hat{y}^2 = R_0^2 \text{ where } x_0 = \frac{\psi+1}{\psi-1}a; R_0 = \frac{2\sqrt{\psi}}{|\psi-1|}a; \psi = \frac{s_1}{s_0} \geq 0 \quad (34)$$

$$(H): \frac{\hat{x}^2}{\delta^2} - \frac{\hat{y}^2}{a^2 - \delta^2} = 1 \text{ where } -a \leq \delta \leq a$$

Hence, $$\begin{cases} \text{either } \psi \geq 1 \text{ and } \frac{\sqrt{\psi}-1}{\sqrt{\psi}+1} \leq \frac{\delta}{a} \leq 1 \\ \text{or } \psi \leq 1 \text{ and } -1 \leq \frac{\delta}{a} \leq \frac{\sqrt{\psi}-1}{\sqrt{\psi}+1} \end{cases} \Rightarrow \begin{cases} \frac{\hat{x}}{a} = \left(\frac{\delta}{a}\right)^2 \frac{\sqrt{\psi}+1}{\sqrt{\psi}-1} \\ \frac{\hat{y}}{a} = \pm \sqrt{\left[1 - \left(\frac{\delta}{a}\right)^2\right]\left[\left(\frac{\delta}{a} \cdot \frac{\sqrt{\psi}+1}{\sqrt{\psi}-1}\right)^2 - 1\right]} \end{cases}$$

If the ML solutions are given by equation (34), then $$\|s - m(\hat{x}, \hat{y}; \hat{\alpha})\|_{\Lambda^{-1}}^2 = 0 \text{ and } \hat{\alpha} = 4\frac{s_1 s_0}{s_1 - s_0} a\hat{x}$$

If $\delta$ and $\psi$ do not satisfy the constraints delineated in equation (34), the sufficient statistics cannot vanish at the ML solution. To solve the problem under these conditions, we seek that estimate ($\hat{x},\hat{y}$) and the associated parameter $\hat{\alpha}$ at which the gradient of the sufficient statistics vanishes, i.e.

$$\nabla_{(x,y,\alpha)}\eta(x, y, \alpha)|_{(\hat{x},\hat{y},\hat{\alpha})} = 0 \quad \text{where} \quad \eta(x, y, \alpha) = \|s - m(x, y; \alpha)\|_{\Lambda^{-1}}^2 \tag{35a}$$

$$\text{and} \quad m(x, y; \alpha) \equiv \begin{bmatrix} m_0 \\ m_1 \\ m_2 \end{bmatrix} = \begin{bmatrix} \dfrac{\alpha}{d_0^2} \\ \dfrac{\alpha}{d_1^2} \\ \dfrac{d_0 - d_1}{2} \end{bmatrix} = \begin{bmatrix} \dfrac{\alpha}{(x+a)^2 + y^2} \\ \dfrac{\alpha}{(x-a)^2 + y^2} \\ \dfrac{\sqrt{(x+a)^2 + y^2} - \sqrt{(x-a)^2 + y^2}}{2} \end{bmatrix} \tag{35b}$$

By chain rule, $$\nabla_{(x,y,\alpha)}\eta(x,y,\alpha) = \nabla_{(x,y,\alpha)}m^T(x,y;\alpha) \cdot \nabla_m \eta(m) \quad \text{where}$$

$$\nabla_{(x,y,\alpha)}m^T(x, y; \alpha) = -2\begin{bmatrix} \alpha\dfrac{x+a}{d_0^4(x,y)} & \alpha\dfrac{x-a}{d_1^4(x,y)} & \dfrac{1}{4}\left(\dfrac{x-a}{d_1(x,y)} - \dfrac{x+a}{d_0(x,y)}\right) \\ \alpha\dfrac{y}{d_0^4(x,y)} & \alpha\dfrac{y}{d_1^4(x,y)} & \dfrac{y}{4}\left(\dfrac{1}{d_1(x,y)} - \dfrac{1}{d_0(x,y)}\right) \\ -\dfrac{1}{2d_0^2(x,y)} & -\dfrac{1}{2d_1^2(x,y)} & 0 \end{bmatrix}$$

$$\nabla_m \eta(m) = -2\Lambda^{-1}[s - m(x,y;\alpha)]$$

Of the three equations above, substitute the last two into the first to obtain the gradient of the sufficient statistics, then set the resultant to zero according to eq. (35a)

$$\begin{bmatrix} \hat{\alpha}\dfrac{\hat{x}+a}{\sigma_0^2 d_0^4(\hat{x},\hat{y})} & \hat{\alpha}\dfrac{\hat{x}-a}{\sigma_1^2 d_1^4(\hat{x},\hat{y})} & \dfrac{1}{4\sigma_2^2}\left(\dfrac{\hat{x}-a}{d_1(\hat{x},\hat{y})} - \dfrac{\hat{x}+a}{d_0(\hat{x},\hat{y})}\right) \\ \hat{\alpha}\dfrac{\hat{y}}{\sigma_0^2 d_0^4(\hat{x},\hat{y})} & \hat{\alpha}\dfrac{\hat{y}}{\sigma_1^2 d_1^4(\hat{x},\hat{y})} & \dfrac{\hat{y}}{4\sigma_2^2}\left(\dfrac{1}{d_1(\hat{x},\hat{y})} - \dfrac{1}{d_0(\hat{x},\hat{y})}\right) \\ -\dfrac{1}{2\sigma_0^2 d_0^2(\hat{x},\hat{y})} & -\dfrac{1}{2\sigma_1^2 d_1^2(\hat{x},\hat{y})} & 0 \end{bmatrix} \begin{bmatrix} s_0 - \dfrac{\hat{\alpha}}{d_0^2(\hat{x},\hat{y})} \\ s_1 - \dfrac{\hat{\alpha}}{d_1^2(\hat{x},\hat{y})} \\ \delta - \dfrac{d_0(\hat{x},\hat{y}) - d_1(\hat{x},\hat{y})}{2} \end{bmatrix} = 0 \tag{36}$$

To improve computational efficiency, we can easily eliminate $\hat{\alpha}$ using the third equation in (36) and the system of equations is reduced to $$M(\hat{x}, \hat{y})\left[ s_0 - \beta(\hat{x},\hat{y})d_1^2(\hat{x},\hat{y}) \quad s_1 - \beta(\hat{x},\hat{y})d_0^2(\hat{x},\hat{y}) \quad \delta - \dfrac{d_0(\hat{x},\hat{y}) - d_0(\hat{x},\hat{y})}{2} \right]^T = 0 \quad \text{where}$$

$$M(\hat{x}, \hat{y}) \equiv \begin{bmatrix} \dfrac{(\hat{x}+a)\beta(\hat{x},\hat{y})d_1^2(\hat{x},\hat{y})}{\sigma_0^2 d_0^2(\hat{x},\hat{y})} & \dfrac{(\hat{x}-a)\beta(\hat{x},\hat{y})d_0^2(\hat{x},\hat{y})}{\sigma_1^2 d_1^2(\hat{x},\hat{y})} & \dfrac{1}{4\sigma_2^2}\left(\dfrac{\hat{x}-a}{d_1(\hat{x},\hat{y})} - \dfrac{\hat{x}+a}{d_0(\hat{x},\hat{y})}\right) \\ \dfrac{\hat{y}\beta(\hat{x},\hat{y})d_1^2(\hat{x},\hat{y})}{\sigma_0^2 d_0^2(\hat{x},\hat{y})} & \dfrac{\hat{y}\beta(\hat{x},\hat{y})d_0^2(\hat{x},\hat{y})}{\sigma_1^2 d_1^2(\hat{x},\hat{y})} & \dfrac{\hat{y}}{4\sigma_2^2}\left(\dfrac{1}{d_1(\hat{x},\hat{y})} - \dfrac{1}{d_0(\hat{x},\hat{y})}\right) \end{bmatrix}$$

$$\beta(\hat{x},\hat{y}) \equiv \dfrac{s_0\sigma_1^2 d_1^2(\hat{x},\hat{y}) + s_1\sigma_0^2 d_0^2(\hat{x},\hat{y})}{\sigma_1^2 d_1^4(\hat{x},\hat{y}) + \sigma_0^2 d_0^4(\hat{x},\hat{y})} \quad \text{and} \quad \hat{\alpha}(\hat{x},\hat{y}) \equiv \beta(\hat{x},\hat{y})d_0^2(\hat{x},\hat{y})d_1^2(\hat{x},\hat{y})$$

A Matlab subroutine employing algebraic root-solving methods may be written to solve for the ML solutions and the associated optimal value of $\hat{\alpha}$ from the above equations.

For systems employing signal-power and TDoA measurements with more than two receivers, the analysis quickly becomes intractable. However, numerical solutions require only a straightforward extension of the above method where the system order increases linearly with the number of receivers. We expect $-a \leq \delta \leq a$ in the absence of noise. This is almost trivial by considering the triangle APC in FIG. 9 where $2\delta$, which is the difference between two sides PA and PC, must be smaller than the third side AC, the length of which is $2a$. Hence, one would argue that performance may be enhanced if TDoA samples resulting in $|\delta| > a$, which must be heavily corrupted by noise for the reason mentioned above, are altogether disregarded.

Following the same approach as in previous analyses, the first step is to determine the Fisher's information matrix defined by equation (11b). We begin by evaluating the gradient of the log-likelihood function:

$$\nabla_{(x,y)} \ln p(s \mid m(x, y)) = \nabla_{(x,y)} m^T(x, y) \cdot \nabla_m \ln p(s \mid m(x, y)) \text{ where} \quad (37)$$

$$\nabla_{(x,y)} m^T(x, y) = \begin{bmatrix} \frac{\partial m_0}{\partial x} & \frac{\partial m_1}{\partial x} & \frac{\partial m_2}{\partial x} \\ \frac{\partial m_0}{\partial y} & \frac{\partial m_1}{\partial y} & \frac{\partial m_2}{\partial y} \end{bmatrix} = -2 \begin{bmatrix} \frac{m_0(x+a)}{d_0^2(x,y)} & \frac{m_1(x-a)}{d_1^2(x,y)} & \frac{m_2 x - \frac{d_0(x,y)+d_1(x,y)}{2} a}{2 d_0(x,y) d_1(x,y)} \\ \frac{m_0 y}{d_0^2(x,y)} & \frac{m_1 y}{d_1^2(x,y)} & \frac{m_2 y}{2 d_0(x,y) d_1(x,y)} \end{bmatrix}$$

$$\nabla_m \ln p(s \mid m(x, y)) = \Lambda^{-1}[s - m(x, y)]$$

Substitute the last two expressions into equation (37):

$$\nabla_{(x,y)} \ln p(s \mid m(x, y)) = -2 \begin{bmatrix} \frac{m_0(x+a)}{d_0^2(x,y)} & \frac{m_1(x-a)}{d_1^2(x,y)} & \frac{m_2 x - \frac{d_0(x,y)+d_1(x,y)}{2} a}{2 d_0(x,y) d_1(x,y)} \\ \frac{m_0 y}{d_0^2(x,y)} & \frac{m_1 y}{d_1^2(x,y)} & \frac{m_2 y}{2 d_0(x,y) d_1(x,y)} \end{bmatrix} \Lambda^{-1}[s - m(x, y)]$$

Substitute the last expression into eq. (11b), noting that $E\{[s-m(x,y)][s-m(x,y)]^T\}=\Lambda$, we arrive at the Fisher's information matrix J $$J = 4 \begin{bmatrix} J_{11} & J_{12} \\ J_{21} & J_{22} \end{bmatrix} \quad (38)$$

where the elements of J are given by:

$$J_{11} = \left(\frac{m_0}{\sigma_0}\right)^2 \left[\frac{x+a}{d_0^2(x,y)}\right]^2 + \left(\frac{m_1}{\sigma_1}\right)^2 \left[\frac{x-a}{d_1^2(x,y)}\right]^2 + \left[\frac{m_2 x - \frac{d_0(x,y)+d_1(x,y)}{2} a}{2\sigma_2 d_0(x,y) d_1(x,y)}\right]^2 \quad (39a)$$

$$J_{22} = \left(\frac{m_0}{\sigma_0}\right)^2 \left[\frac{y}{d_0^2(x,y)}\right]^2 + \left(\frac{m_1}{\sigma_1}\right)^2 \left[\frac{y}{d_1^2(x,y)}\right]^2 + \left(\frac{m_2}{\sigma_2}\right)^2 \left[\frac{y}{2 d_0(x,y) d_1(x,y)}\right]^2 \quad (39b)$$

$$J_{12} = J_{21} = \left(\frac{m_0}{\sigma_0}\right)^2 \frac{y(x+a)}{d_0^4(x,y)} + \left(\frac{m_1}{\sigma_1}\right)^2 \frac{y(x-a)}{d_1^4(x,y)} + \frac{m_2 y \left[m_2 x - \frac{d_0(x,y)+d_1(x,y)}{2} a\right]}{[2\sigma_2 d_0(x,y) d_1(x,y)]^2} \quad (39c)$$

To find the Cramer-Rao bound on the error covariance $J^{-1}$ is computed:

$$E\{(x-\hat{x})^2\} \geq J_{11}^{-1}; \; E\{(y-\hat{y})^2\} \geq J_{22}^{-1}; \; \text{where} \quad J^{-1} = \frac{4}{|J|} \begin{bmatrix} J_{22} & -J_{12} \\ -J_{21} & J_{11} \end{bmatrix} \text{ and} \quad (40)$$

$$|J| = \left(\frac{8 a y}{d_0^2 d_1^2}\right)^2 \left\{ \left(\frac{m_0}{\sigma_0} \cdot \frac{m_1}{\sigma_1}\right)^2 + \frac{1}{4}\left(\frac{m_2}{\sigma_2}\right)^2 \left[\left(\frac{m_1}{\sigma_1} \cdot \frac{d_0}{d_0 - d_1}\right)^2 + \left(\frac{m_0}{\sigma_0} \cdot \frac{d_1}{d_0 - d_1}\right)^2\right] \right\}$$

Thus, $$\frac{E\{(x-\hat{x})^2\}}{a^2} \geq \frac{\left(\frac{m_0}{\sigma_0}\right)^2 \left(\frac{d_1}{2a}\right)^4 + \left(\frac{m_1}{\sigma_1}\right)^2 \left(\frac{d_0}{2a}\right)^4 + \frac{1}{4}\left(\frac{m_2}{\sigma_2}\right)^2 \left(\frac{d_0}{2a}\right)^2 \left(\frac{d_1}{2a}\right)^2}{\left(\frac{m_0}{\sigma_0} \cdot \frac{m_1}{\sigma_1}\right)^2 + \frac{1}{4}\left(\frac{m_2}{\sigma_2}\right)^2 \left[\left(\frac{m_1}{\sigma_1} \cdot \frac{d_0}{d_0 - d_1}\right)^2 + \left(\frac{m_0}{\sigma_0} \cdot \frac{d_1}{d_0 - d_1}\right)^2\right]}$$

$$\frac{E\{(y-\hat{y})^2\}}{a^2} \geq \frac{\left(\frac{m_0}{\sigma_0} \cdot \frac{x+a}{y}\right)^2 \left(\frac{d_1}{2a}\right)^4 + \left(\frac{m_1}{\sigma_1} \cdot \frac{x-a}{y}\right)^2 \left(\frac{d_0}{2a}\right)^4 + \frac{1}{4}\left(\frac{m_2}{\sigma_2} \cdot \frac{x - \frac{d_0+d_1}{d_0-d_1} a}{y}\right)^2 \left(\frac{d_0}{2a}\right)^2 \left(\frac{d_1}{2a}\right)^2}{\left(\frac{m_0}{\sigma_0} \cdot \frac{m_1}{\sigma_1}\right)^2 + \frac{1}{4}\left(\frac{m_2}{\sigma_2}\right)^2 \left[\left(\frac{m_1}{\sigma_1} \cdot \frac{d_0}{d_0 - d_1}\right)^2 + \left(\frac{m_0}{\sigma_0} \cdot \frac{d_1}{d_0 - d_1}\right)^2\right]}$$

-continued $$\frac{E\{(x-\hat{x})^2 + (y-\hat{y})^2\}}{a^2} \geq \left(\frac{d_0 d_1}{2ay}\right)^2 \frac{\left(\frac{m_0}{\sigma_0} \cdot \frac{d_1}{2a}\right)^2 + \left(\frac{m_1}{\sigma_1} \cdot \frac{d_0}{2a}\right)^2 + \frac{1}{4}\left(\frac{m_2}{\sigma_2}\right)^2 \frac{\left(x - \frac{d_0+d_1}{d_0-d_1}a\right)^2 + y^2}{4a^2}}{\left(\frac{m_0}{\sigma_0} \cdot \frac{m_1}{\sigma_1}\right)^2 + \frac{1}{4}\left(\frac{m_2}{\sigma_2}\right)^2 \left[\left(\frac{m_1}{\sigma_1} \cdot \frac{d_0}{d_0-d_1}\right)^2 + \left(\frac{m_0}{\sigma_0} \cdot \frac{d_1}{d_0-d_1}\right)^2\right]}$$

The error covariance is a decreasing function of the signal-to-noise-ratios. Recall that the error variance for a localization system employing SS measurements at two receivers is bounded by equation (15). If TDoA is employed in addition to SS measurements, the error variance is bounded by equation (40). The improvement I in estimation error is calculated as $$I = \sqrt{\frac{E\{(x-\hat{x})^2 + (y-\hat{y})^2\}_{SS\ only}}{E\{(x-\hat{x})^2 + (y-\hat{y})^2\}_{SS+TDoA}}} \quad (41)$$

(Improvement in estimation error)

Substitute equations (15) and (40) into equation (41) and square both sides for convenience:

$$I^2 = \frac{\left[\left(\frac{d_1}{m_1/\sigma_1}\right)^2 + \left(\frac{d_0}{m_0/\sigma_0}\right)^2\right]\left\{\left(\frac{m_0}{\sigma_0} \cdot \frac{m_1}{\sigma_1}\right)^2 + \frac{1}{4}\left(\frac{m_2}{\sigma_2}\right)^2\left[\left(\frac{m_1}{\sigma_1} \cdot \frac{d_0}{d_0-d_1}\right)^2 + \left(\frac{m_0}{\sigma_0} \cdot \frac{d_1}{d_0-d_1}\right)^2\right]\right\}}{\left(\frac{m_0}{\sigma_0}d_1\right)^2 + \left(\frac{m_1}{\sigma_1}d_0\right)^2 + \frac{1}{4}\left(\frac{m_2}{\sigma_2}\right)^2\left[\left(x - \frac{d_0+d_1}{d_0-d_1}a\right)^2 + y^2\right]}$$

$$I^2 = \frac{\left(\frac{m_0}{\sigma_0} \cdot \frac{d_1}{d_0-d_1}\right)^2 + \left(\frac{m_1}{\sigma_1} \cdot \frac{d_0}{d_0-d_1}\right)^2 + \frac{1}{4}\left(\frac{\frac{m_2}{\sigma_2}}{\frac{m_0}{\sigma_0} \cdot \frac{m_1}{\sigma_1}}\right)^2\left[\left(\frac{m_1}{\sigma_1} \cdot \frac{d_0}{d_0-d_1}\right)^2 + \left(\frac{m_0}{\sigma_0} \cdot \frac{d_1}{d_0-d_1}\right)^2\right]^2}{\left(\frac{m_0}{\sigma_0} \cdot \frac{d_1}{d_0-d_1}\right)^2 + \left(\frac{m_1}{\sigma_1} \cdot \frac{d_0}{d_0-d_1}\right)^2 + \frac{1}{4}\left(\frac{m_2}{\sigma_2}\right)^2 \frac{[d_0(x-a) - d_1(x+a)]^2 + y^2(d_0-d_1)^2}{(d_0-d_1)^4}}$$

Expand the last term in the denominator, noting that $$d_0^2 = (x+a)^2 + y^2 \text{ and } d_1^2 = (x-a)^2 + y^2: \quad (42)$$

$$I^2 = \frac{\left(\frac{m_0}{\sigma_0} \cdot \frac{d_1}{d_0-d_1}\right)^2 + \left(\frac{m_1}{\sigma_1} \cdot \frac{d_0}{d_0-d_1}\right)^2 + \frac{1}{4}\left(\frac{\frac{m_2}{\sigma_2}}{\frac{m_0}{\sigma_0} \cdot \frac{m_1}{\sigma_1}}\right)^2\left[\left(\frac{m_1}{\sigma_1} \cdot \frac{d_0}{d_0-d_1}\right)^2 + \left(\frac{m_0}{\sigma_0} \cdot \frac{d_1}{d_0-d_1}\right)^2\right]^2}{\left(\frac{m_0}{\sigma_0} \cdot \frac{d_1}{d_0-d_1}\right)^2 + \left(\frac{m_1}{\sigma_1} \cdot \frac{d_0}{d_0-d_1}\right)^2 + \frac{1}{2}\left(\frac{m_2}{\sigma_2}\right)^2 \frac{d_0^2 d_1^2}{(d_0-d_1)^4}\left(1 - \frac{x^2+y^2-a^2}{d_0 d_1}\right)}$$

For known SNR's $m_i/\sigma_i$, the approximate improvement in estimation error at a given point (x,y) may be calculated directly from equation (42). Further simplification is possible by some geometric observations. Consider the following ratio in the denominator of equation (42)

$$\frac{x^2 + y^2 - a^2}{d_0 d_1} = \frac{x^2 + y^2 - a^2}{\sqrt{[(x+a)^2 + y^2][(x-a)^2 + y^2]}}$$

Of course a brute-force application of algebra can simplify the above ratio, but a more elegant method is geometrically illustrated in FIGS. 10(a) and 10(b) which illustrate cases where (x,y) is, respectively, exterior and interior to the circle centered at (0, 0) with radius a.

Figure 10:
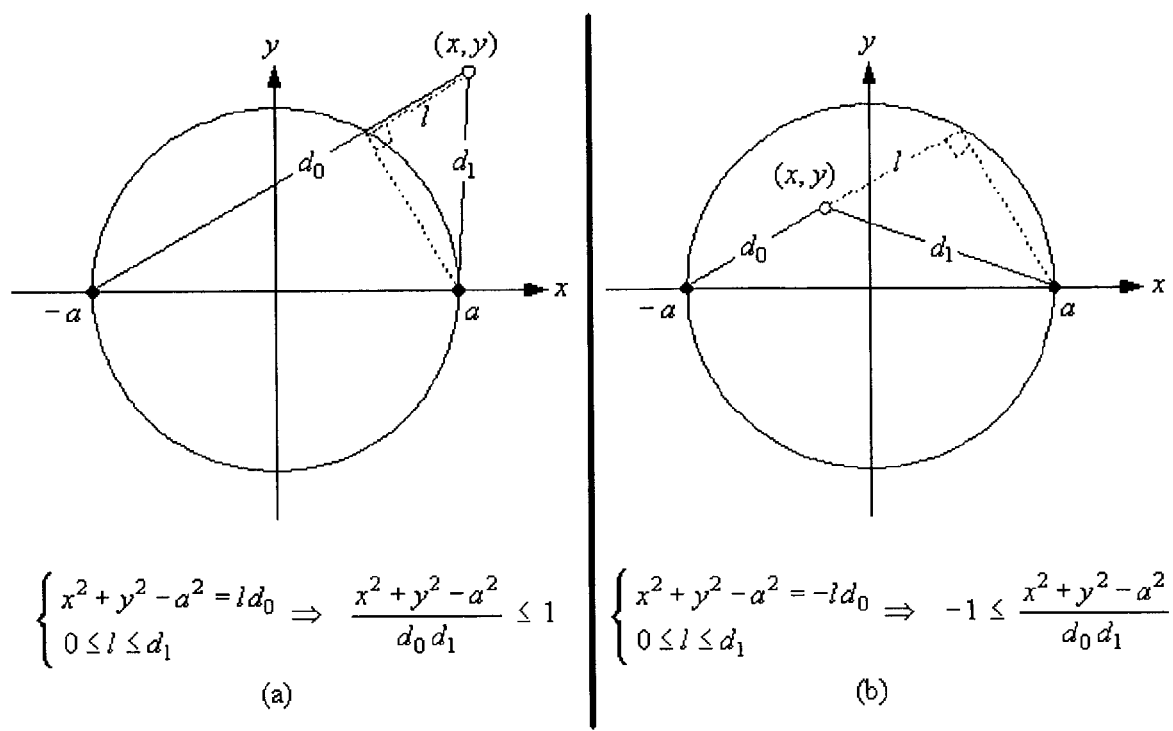
FIG. 10 is a diagram illustrating simplification of equations.

Substitute the inequalities given in FIG. 10 into equation (42) to arrive at the following bounds on the improvement in estimation error $$1 \leq \sqrt{1 + \frac{1}{4}\left(\frac{m_2}{\sigma_2}\right)^2 \frac{(\mu_1 - \mu_0)^2}{\mu_1 + \mu_0 + (m_2/\sigma_2)^2 \mu_0 \mu_1}} \leq \quad (43a)$$

$$1 \leq \sqrt{1 + \frac{1}{4}\left(\frac{m_2}{\sigma_2}\right)^2 (\mu_1 + \mu_0)^2}$$

-continued $$\text{where } \mu_1 \equiv \left(\frac{\sigma_1}{m_1} \cdot \frac{d_1}{d_0 - d_1}\right)^2 \text{ and } \mu_0 \equiv \left(\frac{\sigma_0}{m_0} \cdot \frac{d_0}{d_0 - d_1}\right)^2 \quad (43b)$$

Note that I is never smaller than unity, indicating that employing TDoA measurements in addition to signal-strength always improves the estimation error. Furthermore, the improvement gets better with increasing TDoA signal-to-noise ratio (i.e. $m_2/\sigma_2$), as is intuitively expected.

Development of the maximum-likelihood (ML) solution does not require a priori knowledge of the transmitters' radiated power. In fact, the radiated power can be inferred from the ML solution. The solution relies on normalized received signal-strengths instead of the raw signal-strength data. The method may be used to improve existing schemes to mitigate performance variations due to uncertainties in the transmitters' radiated power. Modifications to the algorithms should be simple. The estimation error decreases with increasing SNR, as is intuitively expected. If signal-power measurements alone are employed for localization, the ML solutions may be entirely constructed using the geometry of circles, lines and harmonic divisions. In two-receiver configurations, there are infinitely many equi-probable ML solutions the loci of which are Apollonius circles (lines being treated as limiting cases of circles). If there are more than two receivers, there are at-most two equi-probable ML solutions which are located at intersections of Apollonius circles. If signal-power and TDoA measurements are employed for localization, the ML solutions may be entirely constructed using the geometry of circles, lines and hyperbolae. For the same number of receivers, the estimation error is always improved in comparison to cases where only either signal power or TDoA alone is employed. Fewer receivers are required for a given level of performance.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

We claim:

1. A method for locating mobile units arranged for radio communication with fixed devices, comprising:
    detecting received signal strength for transmissions from one of said mobile unit to a selected plurality of fixed devices having known locations;
    determining a first location of said mobile unit based on ratios of said detected signal strength for pairs of said fixed devices;
    determining a second location of said mobile unit based on absolute value of said detected signal strengths for each of said fixed devices, corrected by a calibration value for said mobile unit;
    calculating a difference between said first location and said second location;
    selecting said first location for said mobile unit if said difference exceeds a predetermined value; and
    selecting said second location for said mobile unit if said difference does not exceed a predetermined value.

2. A method as specified in claim 1 further comprising updating said correction value for said mobile unit if said difference exceeds said predetermined value.

3. A method for locating mobile units arranged for radio communication with fixed devices within an area, comprising:
    detecting received signal strength for transmissions from one of said mobile units to a selected plurality of fixed devices having known locations;
    determining a first location of said mobile unit based on ratios of said detected signal strength for pairs of said fixed devices;
    determining a second location of said mobile unit based on absolute value of said detected signal strengths for each of said fixed devices, corrected by a calibration value for said mobile unit;
    selecting said first location for said mobile unit if one of said first and second locations is within a selected portion of said area; and
    selecting said second location for said mobile unit if said one of said first and second locations is not within said selected portion of said area.

4. A method for calibrating mobile units arranged for radio communication with fixed devices, comprising:
    detecting received signal strength for transmissions between one of said mobile units and a selected plurality of fixed devices having known locations;
    determining a first location of said mobile unit based on ratios of said detected signal strength for pairs of said fixed devices;
    determining a second location of said mobile unit based on absolute value of said detected signal strengths for each of said fixed devices, corrected by a calibration value for said mobile unit;
    calculating a difference between said first location and said second location; and
    updating said calibration value for said mobile unit if said difference exceeds a predetermined value.

5. A method as specified in claim 4 wherein said updating is performed only if a selected one of said first and second locations is within a selected portion of said area.

* * * * *

UNITED STATES PATENT AND TRADEMARK OFFICE
CERTIFICATE OF CORRECTION

PATENT NO. : 7,308,276 B2
APPLICATION NO. : 10/454147
DATED : December 11, 2007
INVENTOR(S) : Goren et al.

It is certified that error appears in the above-identified patent and that said Letters Patent is hereby corrected as shown below:

IN THE SPECIFICATION

3. In Column 5, Line 64, in Equation (4b), delete " $\eta(m(x,y;\alpha)) \geq \eta(\hat{m}(x,y;\alpha)) \geq 0$ ," and insert -- $\eta(m(x,y;\alpha)) \geq \eta(\hat{m}(x,y;\alpha)) \geq 0$ ; --, therefor.

4. In Column 6, Line 10, in Equation (5), delete " where $u(x,y) = \frac{m}{\alpha} = \begin{bmatrix} u_0 \\ u_1 \end{bmatrix} = \begin{bmatrix} \frac{1}{d_0^2} \\ \frac{1}{d_1^2} \end{bmatrix} = \alpha \begin{bmatrix} \frac{1}{(x+a)^2 + y^2} \\ \frac{1}{(x-a)^2 + y^2} \end{bmatrix}$ " and insert -- where $u(x,y) = \frac{m}{\alpha} = \begin{bmatrix} u_0 \\ u_1 \end{bmatrix} = \begin{bmatrix} \frac{1}{d_0^2} \\ \frac{1}{d_1^2} \end{bmatrix} = \begin{bmatrix} \frac{1}{(x+a)^2 + y^2} \\ \frac{1}{(x-a)^2 + y^2} \end{bmatrix}$ --, therefor.

5. In Column 9, Lines 7-8, delete " $d_0^2 = \overline{PA}^2 = (x+a)^2 + y^2$; $d_1^2 = \overline{PB}^2 = (x-b)^2 + y^2$ and $d_2^2 = \overline{PC}^2 = x^2 + (y-c)^2$ " and insert -- $d_0^2 = \overline{PA}^2 = (x+a)^2 + y^2$; $d_1^2 = \overline{PB}^2 = (x-b)^2 + y^2$ and $d_2^2 = \overline{PC}^2 = x^2 + (y-c)^2$ --, therefor.

6. In Column 10, Line 45, delete "(=D, 0)." and insert -- (-D, 0). --, therefor

Signed and Sealed this
Twenty-fifth Day of October, 2011

David J. Kappos
*Director of the United States Patent and Trademark Office*

CERTIFICATE OF CORRECTION (continued)
U.S. Pat. No. 7,308,276 B2

7. In Column 10, Lines 48-53, in Equation (19), delete "
$$\begin{bmatrix} x' \\ y' \end{bmatrix} = \frac{1}{2D} \begin{bmatrix} R_1^2 - R_0^2 - D^2 \pm \\ \sqrt{4D^2 R_0^2 - (R_1^2 - R_0^2 - D^2)^2} \end{bmatrix} = \frac{1}{2D} \begin{bmatrix} R_1^2 - R_0^2 - D^2 \pm \\ \sqrt{2(R_1^2 R_0^2 + R_0^2 D^2 + D^2 R_1^2) - (R_1^4 + R_0^4 + D^4)} \end{bmatrix}$$
" and insert -- $$\begin{bmatrix} x' \\ y' \end{bmatrix} = \frac{1}{2D} \begin{bmatrix} R_1^2 - R_0^2 - D^2 \\ \pm\sqrt{4D^2 R_0^2 - (R_1^2 - R_0^2 - D^2)^2} \end{bmatrix} = \frac{1}{2D} \begin{bmatrix} R_1^2 - R_0^2 - D^2 \\ \pm\sqrt{2(R_1^2 R_0^2 + R_0^2 D^2 + D^2 R_1^2) - (R_1^4 + R_0^4 + D^4)} \end{bmatrix}$$ --, therefor.

8. In Column 10, Lines 61-66, in Equation (20), delete "
$$\begin{bmatrix} \hat{x} \\ \hat{y} \end{bmatrix} = \begin{bmatrix} x_0 \\ 0 \end{bmatrix} - \frac{1}{2D^2} \begin{bmatrix} x_1 - x_0 & -y_1 \\ y_1 & x_1 - x_0 \end{bmatrix} \begin{bmatrix} R_1^2 - R_0^2 - D^2 \pm \\ \sqrt{4D^2 R_0^2 - (R_1^2 - R_0^2 - D^2)^2} \end{bmatrix}$$
" and insert -- $$\begin{bmatrix} \hat{x} \\ \hat{y} \end{bmatrix} = \begin{bmatrix} x_0 \\ 0 \end{bmatrix} - \frac{1}{2D^2} \begin{bmatrix} x_1 - x_0 & -y_1 \\ y_1 & x_1 - x_0 \end{bmatrix} \begin{bmatrix} R_1^2 - R_0^2 - D^2 \\ \pm\sqrt{4D^2 R_0^2 - (R_1^2 - R_0^2 - D^2)^2} \end{bmatrix}$$ --, therefor.

9. In Column 19, below "By Chain rule,", delete " $\nabla_{(x,y,\alpha)} \eta(x,y;\alpha) = \nabla_{(x,y,\alpha)} m^T(x,y;\alpha) \cdot \nabla_m \eta(m)$ " and insert -- $\nabla_{(x,y,\alpha)} \eta(x,y;\alpha) = \nabla_{(x,y,\alpha)} m^T(x,y;\alpha) \cdot \nabla_m \eta(m)$ --, therefor.